United States Patent
Furukawa et al.

(10) Patent No.: US 8,994,725 B1
(45) Date of Patent: Mar. 31, 2015

(54) SYSTEMS AND METHODS FOR GENERATING A MODEL OF AN ENVIRONMENT

(75) Inventors: Yasutaka Furukawa, Bellevue, WA (US); Steven Maxwell Seitz, Seattle, WA (US); Jianxiong Xiao, Cambridge, MA (US); Carlos Hernandez Esteban, Kirkland, WA (US); David Robert Gallup, Lynwood, WA (US)

(73) Assignee: Google Inc., Mountain View, CA (US)

( * ) Notice: Subject to any disclaimer, the term of this patent is extended or adjusted under 35 U.S.C. 154(b) by 439 days.

(21) Appl. No.: 13/414,658

(22) Filed: Mar. 7, 2012

Related U.S. Application Data

(60) Provisional application No. 61/581,875, filed on Dec. 30, 2011.

(51) Int. Cl.
*G06T 17/00* (2006.01)
*G06T 17/10* (2006.01)

(52) U.S. Cl.
CPC ............. *G06T 17/10* (2013.01); *G06T 2210/04* (2013.01)
USPC ........................................................ 345/420

(58) Field of Classification Search
CPC ......... G06T 17/00; G06T 17/05; G06T 17/10; G06T 2210/04; G06F 17/5004
USPC ....................... 345/419, 420; 703/1
See application file for complete search history.

(56) References Cited

U.S. PATENT DOCUMENTS

| | | | |
|---|---|---|---|
| 6,137,492 A * | 10/2000 | Hoppe ........................... | 345/420 |
| 6,456,288 B1 | 9/2002 | Brockway et al. | |
| 7,523,411 B2 | 4/2009 | Carlin | |
| 2006/0061566 A1 * | 3/2006 | Verma et al. ................... | 345/419 |
| 2006/0152522 A1 * | 7/2006 | Strassenburg-Kleciak et al. ............................. | 345/582 |
| 2009/0006480 A1 | 1/2009 | Fuchs et al. | |
| 2009/0216501 A1 | 8/2009 | Yeow et al. | |
| 2011/0218777 A1 * | 9/2011 | Chen et al. ........................ | 703/1 |

OTHER PUBLICATIONS

Frédérique et al.; 3D GIS as Applied to Cadastre—A Benchmark of Today's Capabilities; FIG Working Week 2011 Bridging the Gap between Cultures; May 2011.*
Okorn et al.; Toward Automatic Modeling of Floor Plans; Proceedings of the Symposium on 3D Data Processing, Visualization and Transmission, May 2010.*
Vosselman et al.; 3D Building Model Reconstruction From Point Clouds and Ground Plans; International Archives of Phtogrammetry and Remote Sensing, vol. XXXIV-3/W4; Oct. 2001.*
Brenner et al.; Fast production of Virtual Reality City Models; IAPRS, vol. 32/4, ISPRS Commission IV Symposium on GIS—Between Visions and Applications, 1998.*

(Continued)

*Primary Examiner* — Carlos Perromat
(74) *Attorney, Agent, or Firm* — Lerner, David, Littenberg, Krumholz & Mentlik, LLP

(57) ABSTRACT

System and methods for generating a model of an environment are provided. In some aspects, a system includes a layer module configured to identify one or more layers of the environment based on a plurality of three-dimensional (3D) points mapping the environment. The system also includes a layout module configured to generate a layout for each layer. Each layout includes a two-dimensional (2D) model of the environment. The system also includes a construction module configured to generate a 3D model of the environment based on the 2D model of each layout.

26 Claims, 15 Drawing Sheets

(56) References Cited

OTHER PUBLICATIONS

Furukawa et al., "Accurate and robust line segment extraction by analyzing distribution around peaks in Hough space", Computer Vision and Image Understanding, 2003, pp. 1-25, vol. 92.

Kazhdan et al., "Poisson Surface Reconstruction", Eurographics Symposium on Geometry Processing, 2006.

Li et al., "GlobFit: Consistently Fitting Primitives by Discovering Global Relations", ACM Transactions on Graphics (TOG)—Proceedings of ACM SIGGRAPH 2011, Jul. 2011, vol. 30, Issue 4.

Merrell et al., "Computer-Generated Residential Building Layouts", ACM Transactions on Graphics (TOG)—Proceedings of ACM SIGGRAPH Asia 2010, Dec. 2010, vol. 29, Issue 6.

Hough, "Machine Analysis of Bubble Chamber Pictures", International Conference on High-Energy Accelerators and Instrumentation—CERN 1959, Sep. 14-19, 1959, pp. 554-556.

Felzenszwalb et al., "Distance Transforms of Sampled Functions", Computing and Information Science Technical Reports, Sep. 1, 2004, pp. 1-15, retrieved from <http://hdl.handle.net/1813/5663>.

Furukawa et al., "Reconstructing Building Interiors from Images", 2009 IEEE 12th International Conference on Computer Vision, Sep. 29, 2009-Oct. 2, 2009, pp. 80-87.

Elmqvist et al., A Taxonomy of 30 Occlusion Management for Visualization; IEEE Transactions on Visualization and Computer Graphics, vol. 14 Issue 5, Sep. 2008.

Knodel et al.; Interactive Generation and Modification of Cutaway Illustrations for Polygonal Models; SG'09 Proceedings of the 10th International Symposium on Smart Graphics; 2009.

Koussa et al., A Simplified Geometric and Topological Modeling of 30 Buildings Enriched by Semantic Data: Combination of Surface-based and Solid-based Representations; GIS Ostrava 2009.

\* cited by examiner

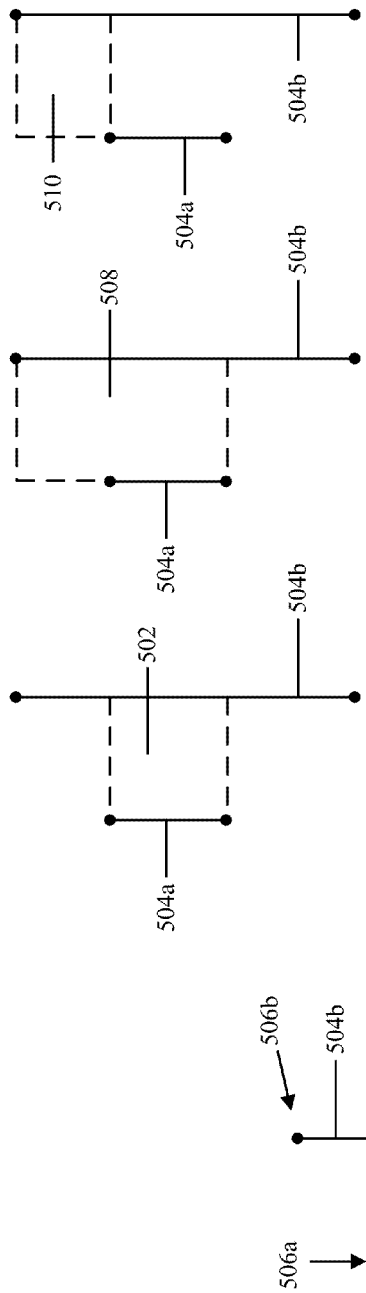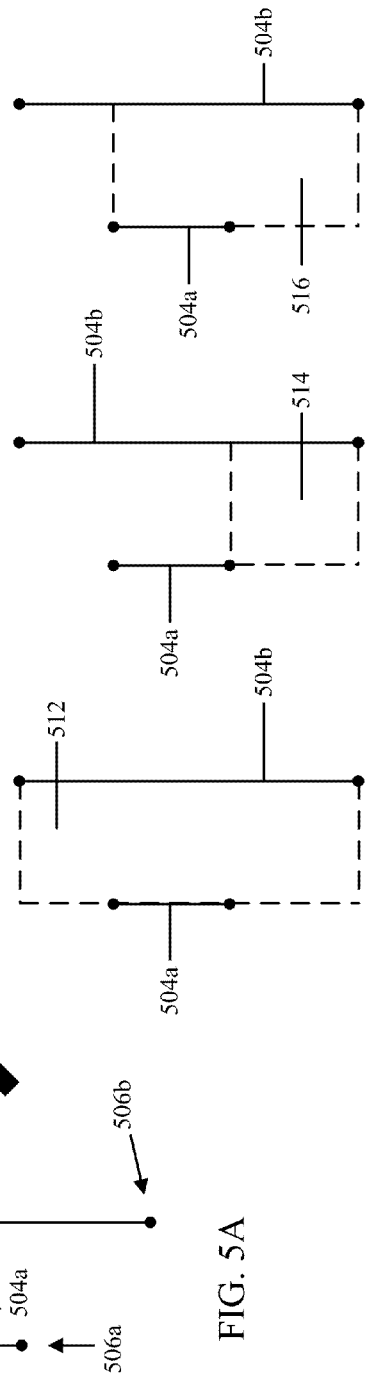

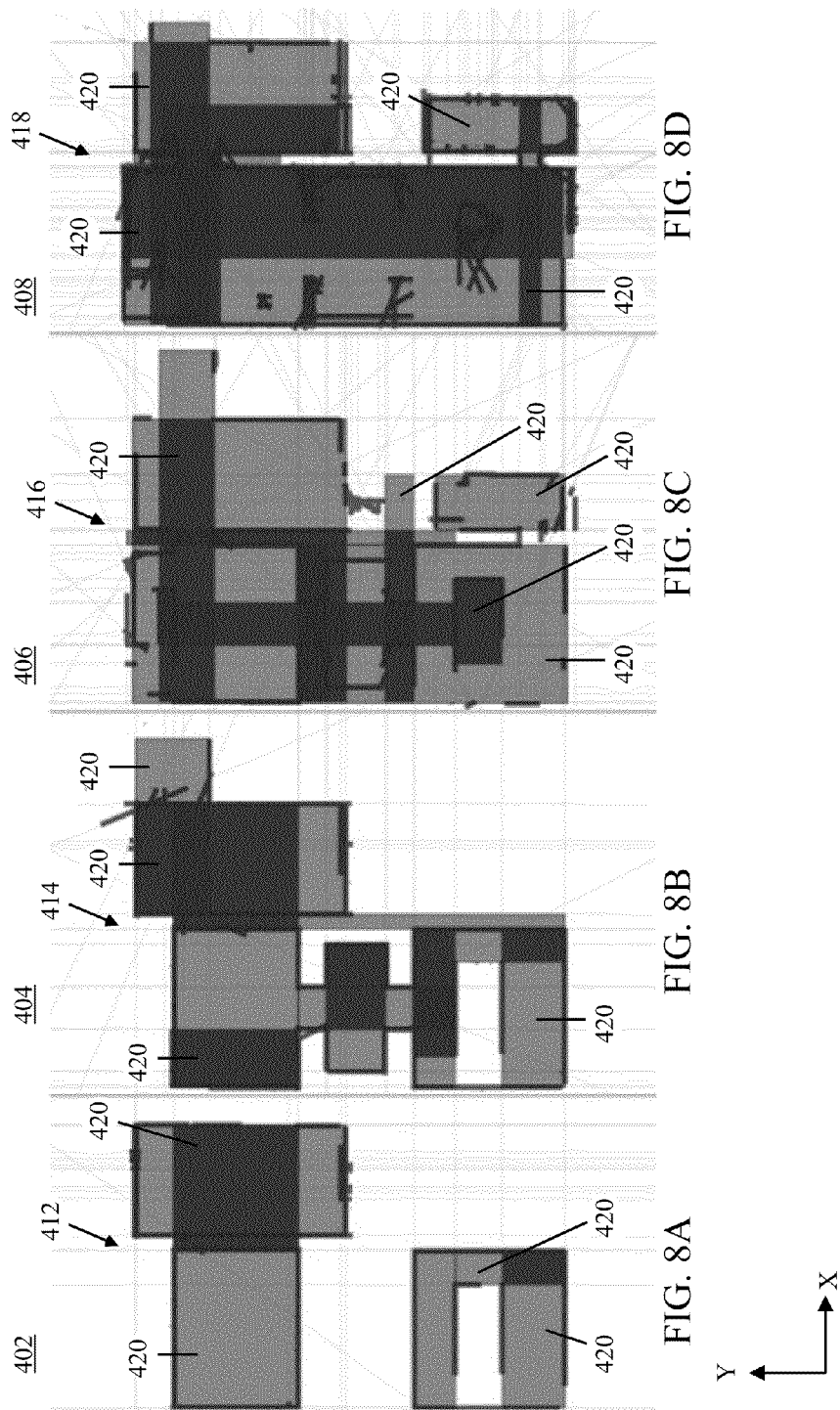

SYSTEMS AND METHODS FOR GENERATING A MODEL OF AN ENVIRONMENT

CROSS-REFERENCES TO RELATED APPLICATIONS

The present application claims the benefit of U.S. Provisional Patent Application Ser. No. 61/581,875, entitled "Systems and Methods for Generating a Model of an Environment," filed on Dec. 30, 2011, which is hereby incorporated by reference in its entirety for all purposes.

FIELD

The subject technology generally relates to graphics modeling and, in particular, relates to systems and methods for generating a model of an environment.

BACKGROUND

A mapping application typically provides a user with an aerial view of a geographic area, which may contain one or more structures. While the mapping application may provide the user with useful information for navigating around the geographic area, the mapping application typically does not provide any useful information for navigating within the one or more structures. It is therefore desirable to provide models of indoor environments so that useful information for navigating around the indoor environments can be provided to the user as well.

SUMMARY

According to various aspects of the subject technology, a system for generating a model of an environment is provided. The system comprises a layer module configured to identify one or more layers of the environment based on a plurality of three-dimensional (3D) points mapping the environment. The system also comprises a layout module configured to generate a layout for each layer. Each layout comprises a two-dimensional (2D) model of the environment. The system also comprises a construction module configured to generate a 3D model of the environment based on the 2D model of each layout.

According to various aspects of the subject technology, a computer-implemented method for generating a model of an environment is provided. The method comprises identifying one or more layers of the environment based on a plurality of three-dimensional (3D) points mapping the environment. The method also comprises generating a layout for each layer. Each layout comprises a two-dimensional (2D) model of the environment. The method also comprises generating a 3D model of the environment based on the 2D model of each layout.

According to various aspects of the subject technology, a machine-readable medium encoded with executable instructions for generating a model of an environment is provided. The instructions comprising code for identifying one or more layers of the environment based on a plurality of three-dimensional (3D) points mapping the environment. The instructions also comprise code for generating a layout for each layer, code for projecting the plurality of 3D points onto corresponding ones of the one or more layouts, code for generating one or more line segments for each layout based on corresponding ones of the plurality of projected 3D points, code for generating one or more 2D primitives for each layout based on corresponding ones of the one or more line segments, code for selecting a 2D set of the one or more 2D primitives based on corresponding ones of the plurality of 3D points, code for generating a two-dimensional (2D) model of the environment for each layout based on a corresponding 2D set of the one or more 2D primitives, and code for generating a 3D model of the environment based on the 2D model of each layout.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIGS. 5A, 5B, 5C, 5D, 5E, 5F, and 5G illustrate examples of generating 2D primitives based on line segments, in accordance with various aspects of the subject technology.

FIGS. 8A, 8B, 8C, and 8D illustrate 2D models comprising one or more selected 2D primitives, in accordance with various aspects of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

A plurality of three-dimensional (3D) points (e.g., a 3D point cloud) may be used to map an environment (e.g., capture an outline of the environment). For example, a trolley comprising one or more laser scanners may traverse an indoor environment while the one or more laser scanners scan the indoor environment to collect laser 3D points that map the indoor environment. Using the position of the trolley, the time at which each 3D point was scanned, the angle at which each 3D point was scanned, and/or other suitable information, the position of each 3D point may be determined (e.g., elevation and/or horizontal coordinates that may be expressed as coordinates relative to an x-axis, a y-axis, and a z-axis). Thus, a plurality of 3D points may map an indoor environment. According to various aspects of the subject technology, a 3D model of the indoor environment may be generated using the plurality of 3D points. Although indoor environments are described, 3D models of other suitable environments, such as outdoor environments, may also be generated.

Figure 1:
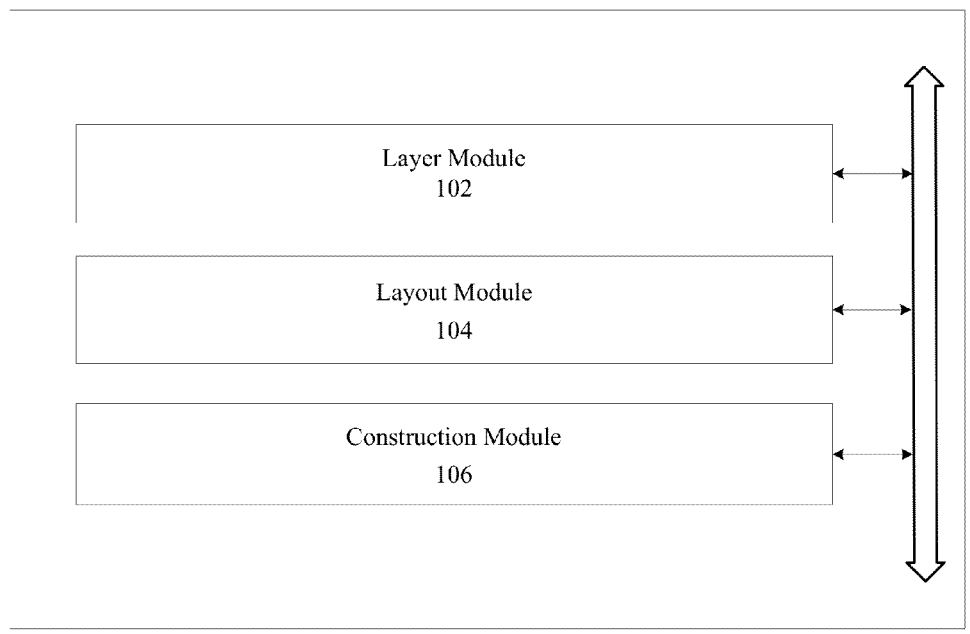
FIG. 1 illustrates an example of a system for generating a model of an environment, in accordance with various aspects of the subject technology.

FIG. 1 illustrates an example of system 100 for generating a model of an environment, in accordance with various aspects of the subject technology. System 100 comprises layer module 102, layout module 104, and construction module 106. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 2:
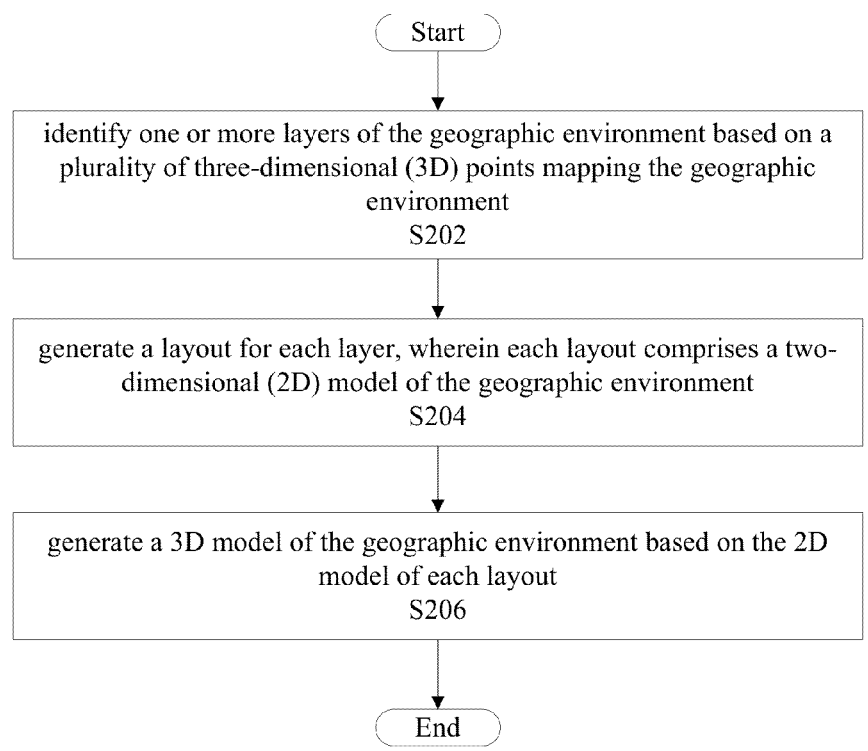
FIG. 2 illustrates an example of a method for generating a model of an environment, in accordance with various aspects of the subject technology.
Figure 3A:
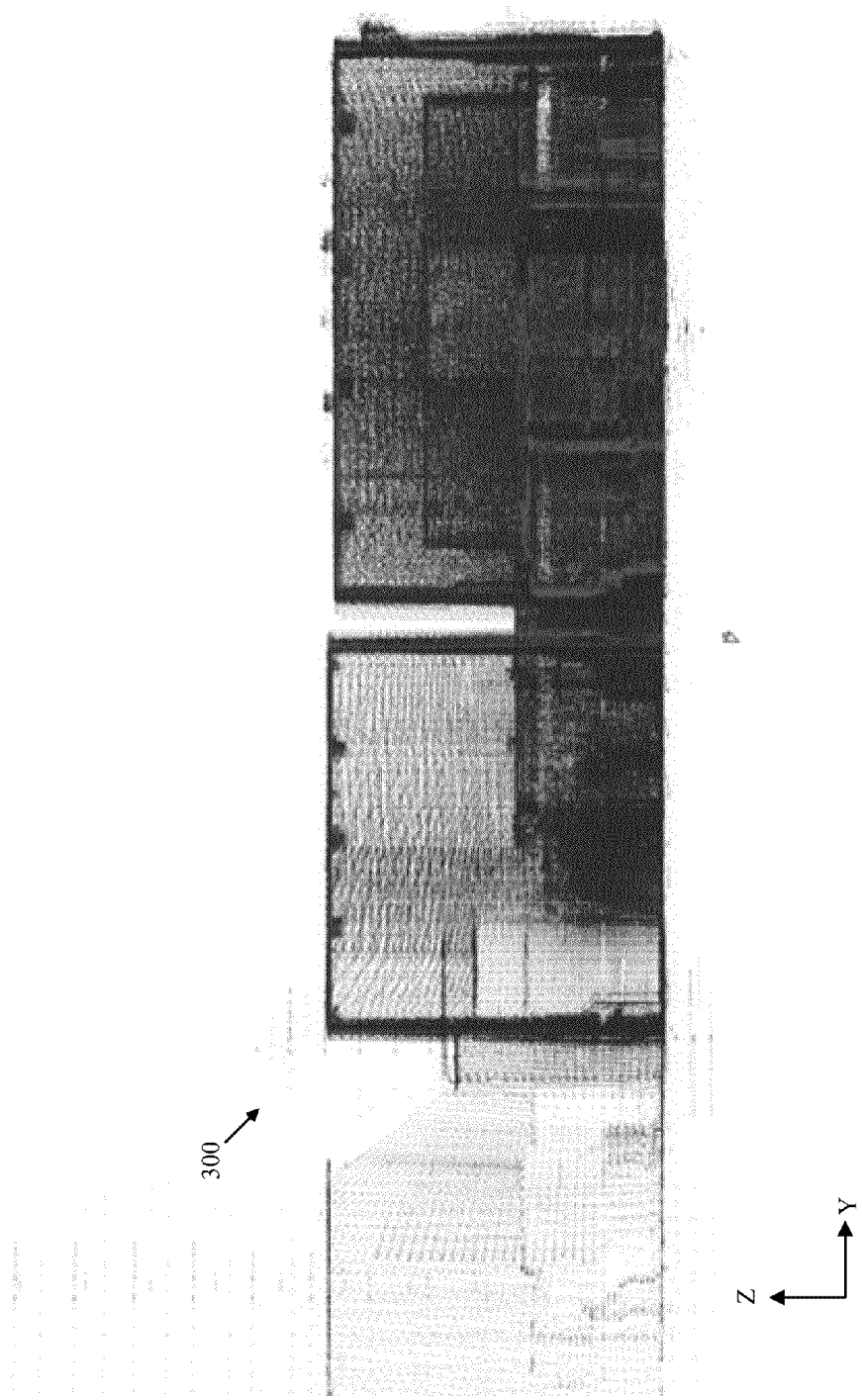
FIG. 3A illustrates an example of a plurality of 3D points mapping an environment, in accordance with various aspects of the subject technology.

FIG. 2 illustrates an example of method 200 for generating a model of an environment, in accordance with various aspects of the subject technology. Method 200, for example, may be implemented by system 100. However, method 200 may be implemented by other suitable systems having different configurations. FIG. 3A illustrates an example of a plurality of 3D points 300 mapping an environment, in accordance with various aspects of the subject technology. FIG. 3A illustrates a side view of the environment mapped by the plurality of 3D points 300. According to certain aspects, the 3D model of the environment may be generated by dividing the plurality of 3D points into different layers, generating a two-dimensional (2D) model of the environment for each layer, and generating the 3D model of the environment based on the 2D models of each layer.

Figure 3B:
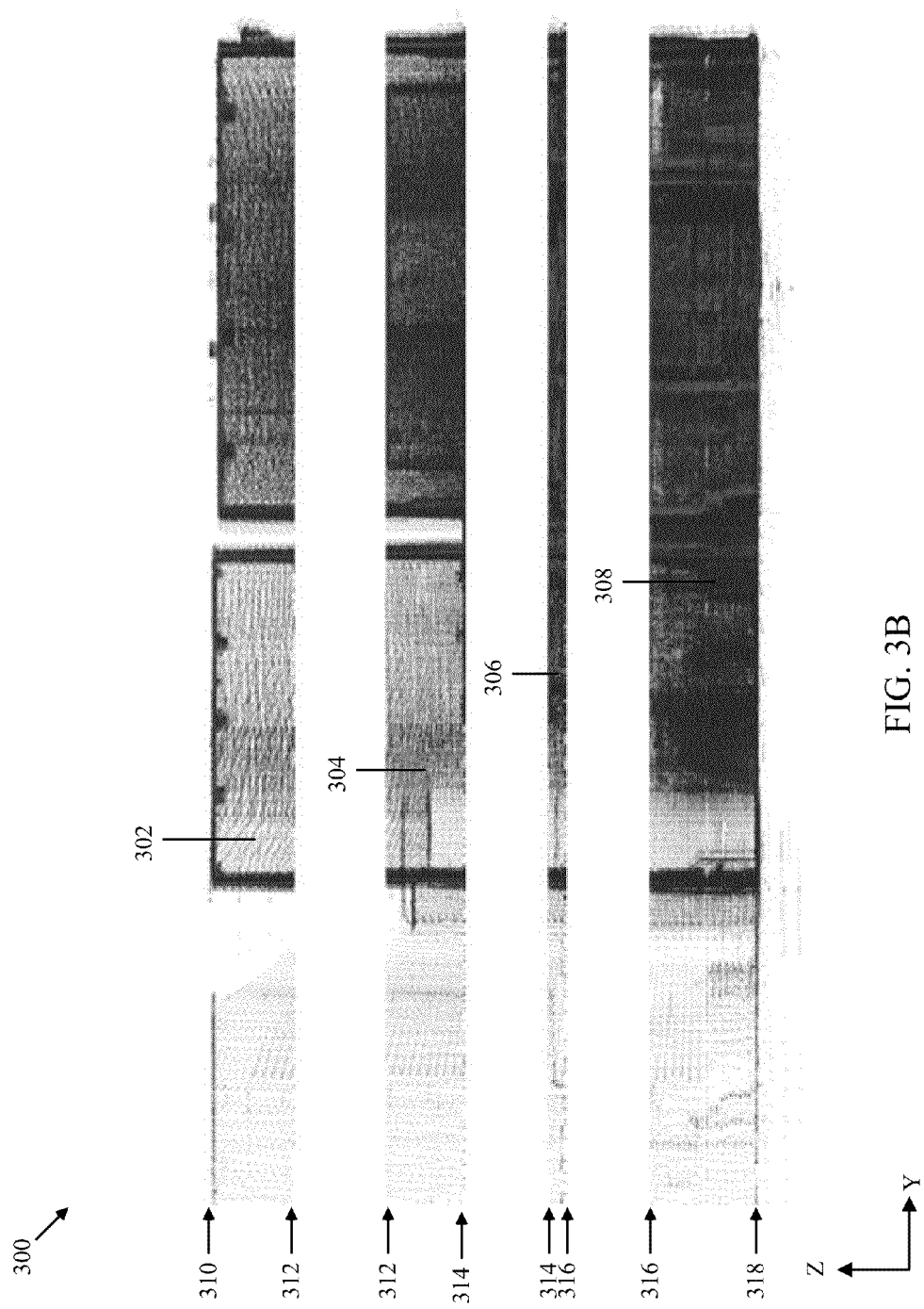
FIG. 3B illustrates an example of the plurality of 3D points divided into layers, in accordance with various aspects of the subject technology.
Figures 4A, 4B, 4C, 4D:
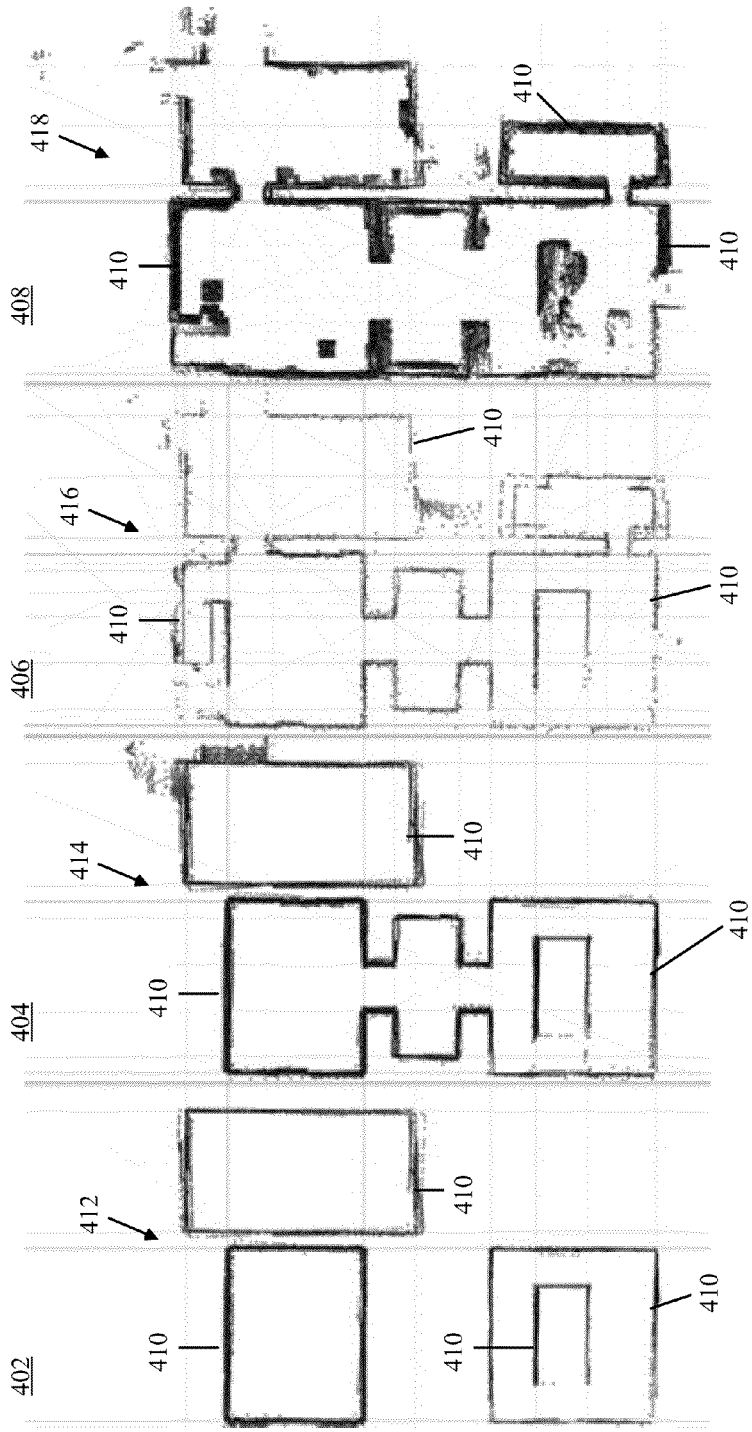
FIGS. 4A, 4B, 4C, and 4D illustrate a top view of examples of layouts, in accordance with various aspects of the subject technology.
Figure 6A:
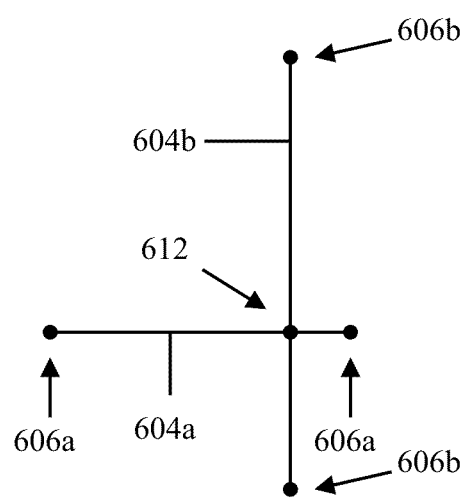
FIGS. 6A, 6B, 6C, 6D, 6E, 6F, 6G, 6H, 6I, and 6J illustrate examples of generating 2D primitives based on line segments, in accordance with various aspects of the subject technology.
Figure 6B:
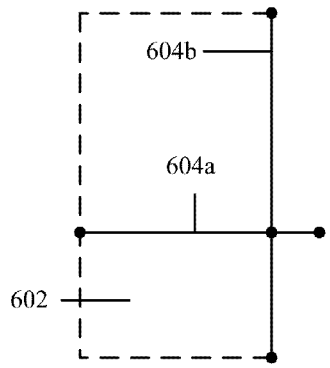
Figure 6C:
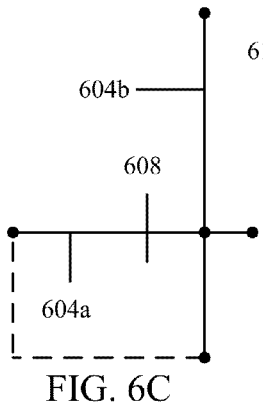
Figure 6D:
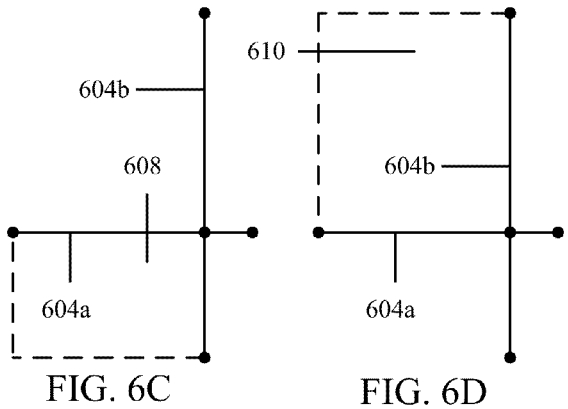
Figure 6E:
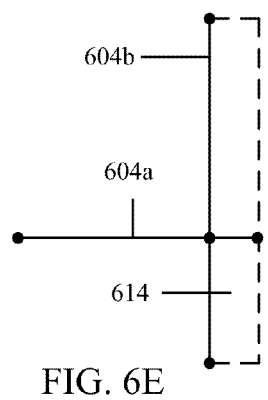
Figure 6F:
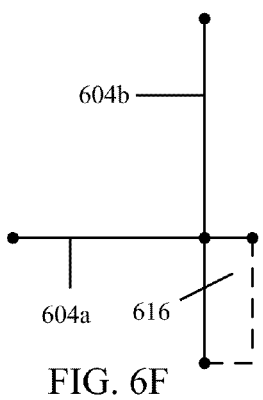
Figure 6G:
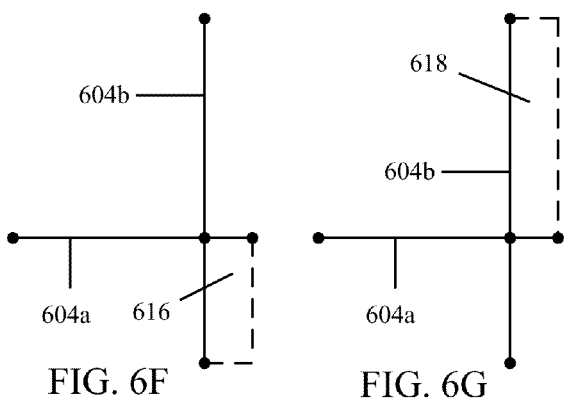
Figure 6H:
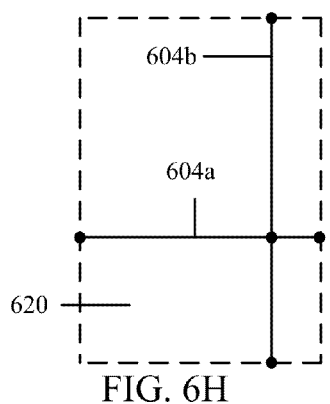
Figure 6I:
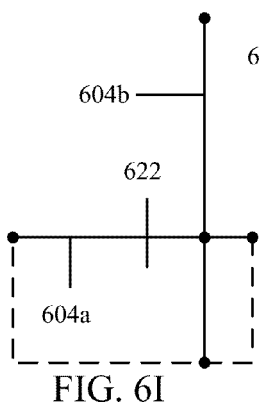
Figure 6J:
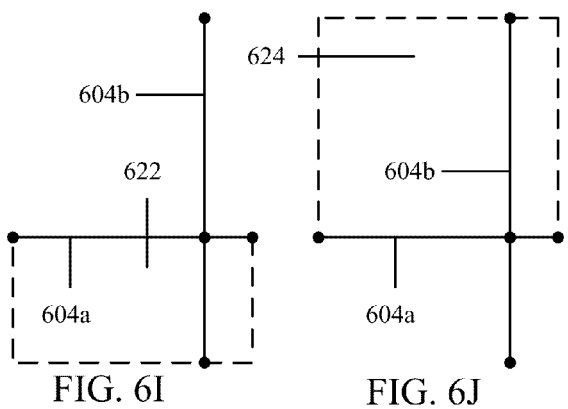

According to step S202 in FIG. 2, layer module 102 may identify one or more layers of the environment based on the plurality of 3D points 300. FIG. 3B illustrates an example of the plurality of 3D points 300 divided into layers 302, 304, 306, and 308, in accordance with various aspects of the subject technology. Each of these layers comprises corresponding ones of the plurality of 3D points 300. The plurality of 3D points 300 may be divided such that each of the layers may be at a separate elevation from one another (e.g., different floors of a structure). According to certain aspects, ceilings, floors, and other separations between layers of the environment may be mapped by more of the plurality of 3D points 300 than at other elevations of the environment. Thus, layer module 102 may identify elevations 310, 312, 314, 316, and 318 of the environment at which the plurality of 3D points 300 exceeds a predetermined layer threshold (e.g., forms a local maximum along a vertical direction), and divide the environment at the identified elevations to form layers 302, 304, 306, and 308. For example, a boundary (either upper or lower) of each of these layers may be formed at respective identified elevations 310, 312, 314, 316, or 318.

According to step S204 in FIG. 2, layout module 104 may generate a layout for each layer. Each layout, for example, may comprise a 2D model of the environment (e.g., a floor plan of a corresponding layer), and may be parallel with a ground plane of the environment. FIGS. 4A, 4B, 4C, and 4D illustrate a top view of examples of layouts 402, 404, 406, and 408, in accordance with various aspects of the subject technology. Layout 402 is a layout for layer 302, layout 404 is a layout for layer 304, layout 406 is a layout for layer 306, and layout 408 is a layout for layer 308. The 2D model of the environment at each layout (e.g., 2D models 412, 414, 416, and 418) may be used to generate the 3D model of the environment. The 2D model of each layout may comprise 2D primitives that may be added to one another and/or subtracted from one another to form a representation of a layout of the environment at a corresponding layer. For example, each 2D model may comprise a constructive solid geometry (CSG) model (e.g., a Boolean combination of two or more 2D primitives). The CSG model may be expressed as a binary tree with each leaf of the tree representing a 2D primitive and each node of the tree representing an operation for the Boolean combination, such as an intersection of two 2D primitives, a union of two 2D primitives, and/or a difference between two 2D primitives. According to certain aspects, each 2D primitive may comprise at least one of a rectangle, a triangle, an ellipse, and other suitable shapes.

To generate the 2D model of the environment for a particular layout, layout module 104 may project corresponding ones of the plurality of 3D points onto the particular layout. For example, the plurality of 3D points 300 are projected perpendicularly onto corresponding ones of layouts 402, 404, 406, and 408 to provide a top view of each layout in FIGS. 4A, 4B, 4C, and 4D. Layout module 104 may then generate one or more line segments 410 for each layout based on corresponding ones of the plurality of projected 3D points 300. For example, the one or more line segments 410 may be generated using a Hough transform or any other suitable techniques for line segment extraction. In some aspects, layout module 104 may assign the plurality of projected 3D points 300 to a nearest one of the one or more line segments 410, and may remove at least one of the one or more line segments 410 having less than a predetermined threshold number of projected 3D points assigned to it. In this way, the total number of line segments 410 may be reduced. Furthermore, layout module 104 may estimate at least one horizontal axis of each layout (e.g., the x-axis or y-axis), and may align at least one of the one or more line segments 410 with at least one of the horizontal axes. For example, layout module 104 may snap a particular line segment 410 to be parallel with the x-axis or y-axis if the particular line segment 410 is tilted in a similar manner as the x-axis or y-axis.

Layout module 104 may generate one or more 2D primitives for each layout based on corresponding ones of the one or more line segments 410. For example, at least one of the one or more line segments 410 may form at least a partial side of a corresponding 2D primitive. According to certain aspects, it may be desirable to exhaustively generate as many 2D primitives as possible based on the one or more line segments 410 so that a set of the 2D primitives that provides an accurate representation of the environment can be selected from the many 2D primitives. This set may be referred to as a 2D set.

FIGS. 5A, 5B, 5C, 5D, 5E, 5F, and 5G illustrate examples of generating 2D primitives 502, 508, 510, 512, 514, and 516 based on line segments 504a and 504b, in accordance with various aspects of the subject technology. Line segment 504a comprises endpoints 506a, and line segment 504b comprises endpoints 506b. Line segments 504a and 504b are parallel with one another. If it is determined that line segments 504a and 504b are within a predetermined distance of one another, then 2D primitives may be generated based on line segments 504a and 504b. For example, 2D primitives may be generated based on line segments 504a and 504b by extending lines from endpoints 506a and/or 506b to form a 2D primitive that uses line segments 504a, 504b, and/or the extended lines as its sides. For example, the extended lines may be parallel or perpendicular to line segments 504a or 504b, which may be useful for generating a rectangle. Using such an approach, various 2D primitives 502, 508, 510, 512, 514, and 516 in the shape of different-sized rectangles may be generated, as shown in FIGS. 5B, 5C, 5D, 5E, 5F, and 5G.

FIGS. 6A, 6B, 6C, 6D, 6E, 6F, 6G, 6H, 6I, and 6J illustrate examples of generating 2D primitives 602, 608, 610, 614, 616, 618, 620, 622, and 624 based on line segments 604a and 604b, in accordance with various aspects of the subject technology. Line segment 604a comprises endpoints 606a, and line segment 604b comprises endpoints 606b. Line segments 604a and 604b are perpendicular to one another, and also intersect one another at point 612. In this regard, 2D primitives may be generated based on line segments 604a and 604b. For example, 2D primitives may be generated based on line segments 604a and 604b by extending lines from endpoints 606a and/or 606b to form a 2D primitive that uses line segments 604a, 604b, and/or the extended lines as sides of the 2D primitive. For example, the extended lines may be parallel or perpendicular to line segments 604a or 604b, which may be useful for generating a rectangle. Using such an approach, various 2D primitives 602, 608, 610, 614, 616, 618, 620, 622, and 624 in the shape of different-sized rectangles may be generated, as shown in FIGS. 6B, 6C, 6D, 6E, 6F, 6G, 6H, 6I, and 6J.

Various sized and/or shaped 2D primitives may also be generated using greater than two line segments. For example, four rectangles may be generated if three line segments form a |_|-like shape by using a similar approach of extending lines from the endpoints of these line segments to form the 2D primitives. In another example, a single rectangle may be generated if four line segments already intersect with one another to form a rectangle shape. According to certain aspects, layout module 104 may exhaustively generate a plurality of 2D primitives based on the one or more line segments. After generating these 2D primitives, a 2D set of the 2D primitives that provides an accurate representation of the environment can be selected for generating the 2D model of each layout. For example, each 2D model may comprise a corresponding 2D set of the 2D primitives generated for a corresponding layout.

According to certain aspects, layout module 104 may remove at least one 2D primitive (from the exhaustive number of 2D primitives) having a dimension less than a predetermined threshold, thereby allowing very small and/or narrow 2D primitives that may not be useful for generating the 2D model of each layout to be removed. Layout module 104 may also remove at least one 2D primitive that is substantially the same as another of the one or more 2D primitives. In some aspects, layout module 104 may remove at least one 2D primitive having less than a predetermined number of projected 3D points adjacent to its edge within a predetermined distance. Thus, if a particular 2D primitive has a very few number of projected 3D points adjacent to its edges, this particular 2D primitive may be removed. Furthermore, if the disagreement of normal orientations of the projected 3D points adjacent to the edges is very large, then that particular 2D primitive can be removed.

According to various aspects of the subject technology, a matching score may be used to select the 2D set of 2D primitives. The matching score may be indicative of a degree of accuracy of the 2D set with respect to representing corresponding ones of the plurality of projected 3D points. For example, the higher the matching score, the more accurate the 2D set is with respect to representing corresponding ones of the plurality of projected 3D points. Aspects of the subject technology provide a method to maximize the matching score to obtain the 2D set of 2D primitives.

In some aspects, the 2D set comprises an initial one of the 2D primitives. The initial one of the 2D primitives may be selected as one that initially maximizes a matching score for the 2D set. Layout module 104 may determine an addition change in the matching score if a next one of the 2D primitives is added to the 2D set. Layout module 104 may also determine a subtraction change in the matching score if the next one is subtracted from the 2D set. Layout module 104 may also update the 2D set by adding the next one to the 2D set or subtracting the next one from the 2D set based on the addition change and the subtraction change. For example, the next one of the 2D primitives may be added to the 2D set or may be subtracted from the 2D set based on whether the addition change or the subtraction change increases the matching score by more than a predetermined threshold. In some aspects, the next one may be added to the 2D set if the addition change increases the matching score by more than the predetermined threshold. In contrast, the next one may not be added to the 2D set if the addition change does not increase the matching score by more than the predetermined. In some aspects, the next one may be subtracted from the 2D set if the subtraction change increases the matching score by more than the predetermined threshold. In contrast, the next one may not be subtracted from the 2D set if the subtraction change does not increase the matching score by more than the predetermined threshold. The 2D set may be updated accordingly depending on whether the next one of the 2D primitives is to be added to the 2D set or subtracted from the 2D set. Layout module 104 may iterate through the rest of the 2D primitives and repeat the foregoing steps (e.g., determining the addition change, determining the subtraction change, and updating the 2D set) with subsequent ones of the 2D primitives until the matching score is maximized. For example, millions of 2D primitives may be analyzed using the foregoing steps to select approximately five to six 2D primitives as part of the 2D set for generating a corresponding 2D model of the environment.

According to various aspects of the subject technology, the matching score may be given by $$w_s s(t) + w_p p(t) + w_r r(t), \quad (1)$$

where t is the 2D set of the 2D primitives, $w_s$ provides at least a portion of the matching score, s(t) is a function of t and adjusts the at least a portion of the matching score provided by $w_s$ based on an empty space of the environment, $w_p$ provides at least a portion of the matching score, p(t) is a function of t and adjusts the at least a portion of the matching score provided by $w_p$ based on a total number of projected 3D points of a corresponding layout, $w_r$ provides at least a portion of the matching score, and r(t) is a function of t and adjusts the at least a portion of the matching score provided by $w_r$ based on a perimeter of t. $w_s$, $w_p$, and $w_r$ may be assigned any suitable value for generating the matching score.

Figure 7A:
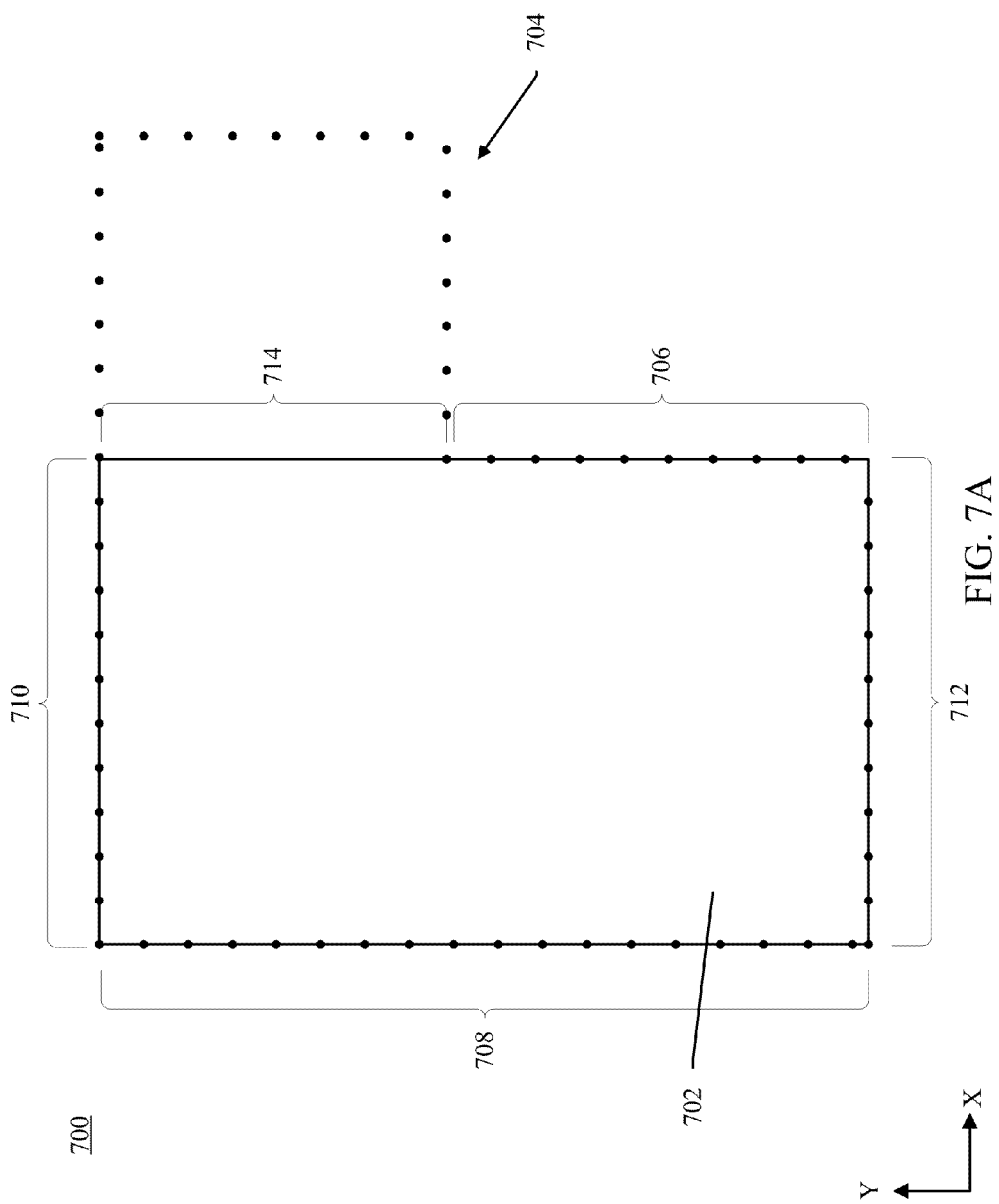
FIGS. 7A, 7B, and 7C illustrate examples of determining a matching score, in accordance with various aspects of the subject technology.
Figure 7B:
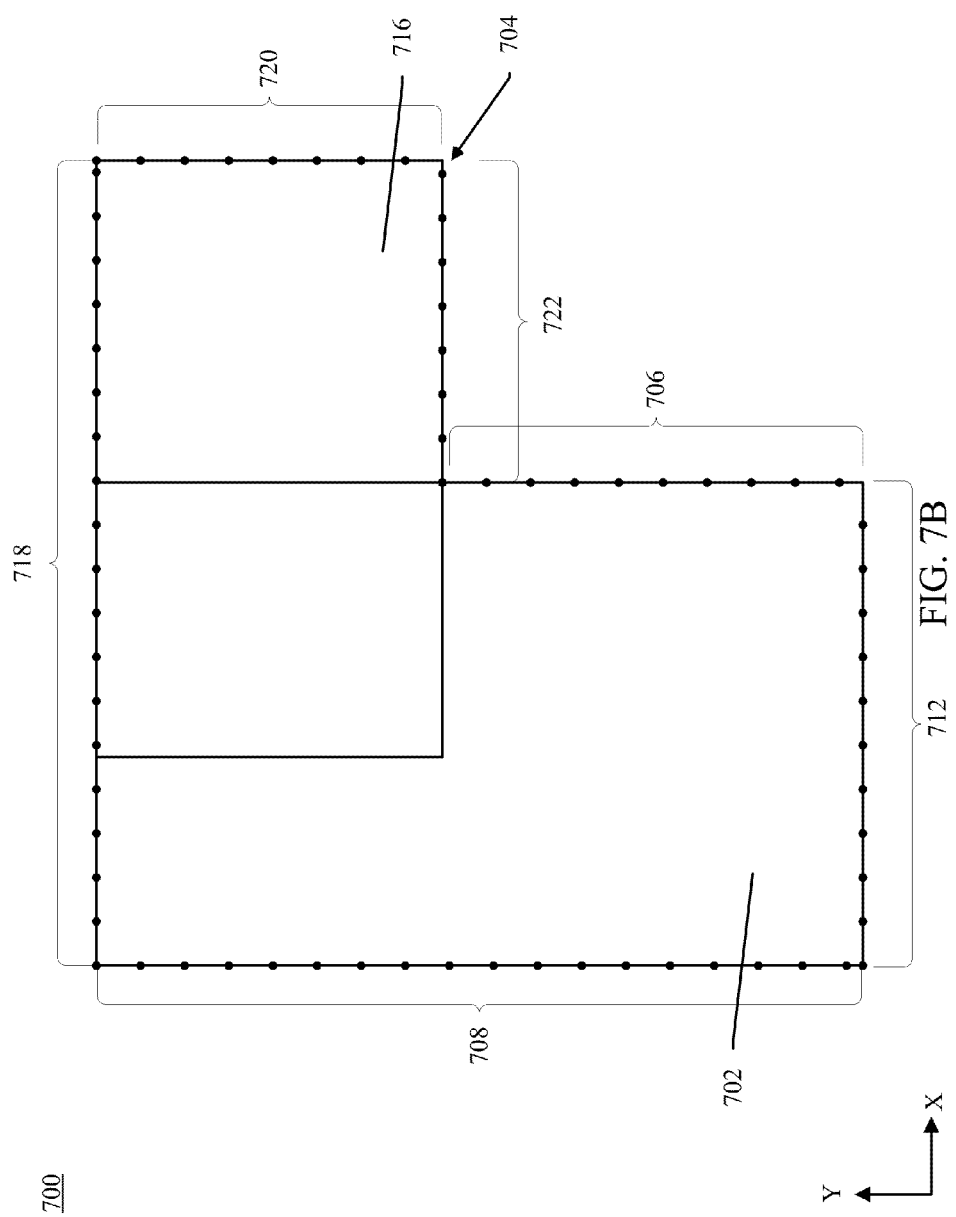

FIGS. 7A and 7B illustrate examples of determining the matching score using p(t) and r(t), in accordance with various aspects of the subject technology. FIG. 7A illustrates an example of layout 700, which comprises a 2D set t for generating a 2D model of the environment represented by a plurality of 3D points 704 (illustrated as dots) projected onto layout 700. The 2D set t comprises a single rectangle 702 as a 2D primitive. In computing the at least a portion of the matching score provided by $w_p$ with respect to the 2D set t, p(t) may be computed as a number of the plurality of projected 3D points 704 that are aligned with a perimeter of t (e.g., rectangle 704) divided by a total number of the plurality of projected 3D points 704. In other words, p(t) may be a ratio of the number of projected 3D points 704 that are accurately represented by rectangle 702 to the total number of projected 3D points 704. The higher this ratio is, the higher the matching score may be. As shown in FIG. 7A, p(t) may be computed as the number of projected 3D points 704 in areas 706, 708, 710, and 712 (e.g., areas where rectangle 702 and projected 3D points 704 overlap with one another) divided by the total number of projected 3D points 704.

Furthermore, in computing the at least a portion of the matching score provided by $w_r$ with respect to the 2D set t, r(t) may be computed as at least a portion of the perimeter of t (e.g., rectangle 702) that is aligned with corresponding ones of the plurality of projected 3D points 704 divided by the perimeter of t. In other words, r(t) may be a ratio of a portion of the perimeter of rectangle 702 that accurately represents the 2D model of the environment represented by the plurality of 3D points 704 to the total perimeter of rectangle 702. The higher this ratio is, the higher the matching score may be. As shown in FIG. 7A, r(t) may be computed as the length of the sides of rectangle 702 at areas 706, 708, 710, and 712 divided by the length of the sides of rectangle 702 at areas 706, 708, 710, 712, and 714.

FIG. 7B illustrates the example of layout 700 with a second rectangle 716 added to the 2D set t, in accordance with various aspects of the subject technology. As shown in FIG. 7B, the 2D set t comprises a union of rectangle 702 and 716. Compared to the 2D set t of FIG. 7A, the 2D set t of FIG. 7B more accurately represents the plurality of projected 3D points 704. As shown in FIG. 7B, the perimeter of t overlaps completely with the plurality of projected 3D points 704. In this regard, p(t) as computed with respect to FIG. 7B may be greater than p(t) as computed with respect to FIG. 7A. For example, p(t) may be computed as the number of projected 3D points 704 in areas 706, 708, 712, 718, 720, and 722 divided by the total number of projected 3D points 704. In this case, because the perimeter of t overlaps completely with the plurality of projected 3D points 704, p(t) provides a high ratio of about one, thereby maximizing the at least a portion of the matching score provided by $w_p$. Similarly, r(t) may be computed as the length of the sides of rectangle 702 at areas 706, 708, 712, 718, 720, and 722 divided by the length of the sides of rectangle 702 at areas 706, 708, 712, 718, 720, and 722. In this case, r(t) also provides a high ratio of about one, thereby maximizing the at least a portion of the matching score provided by $w_r$.

Figure 7C:
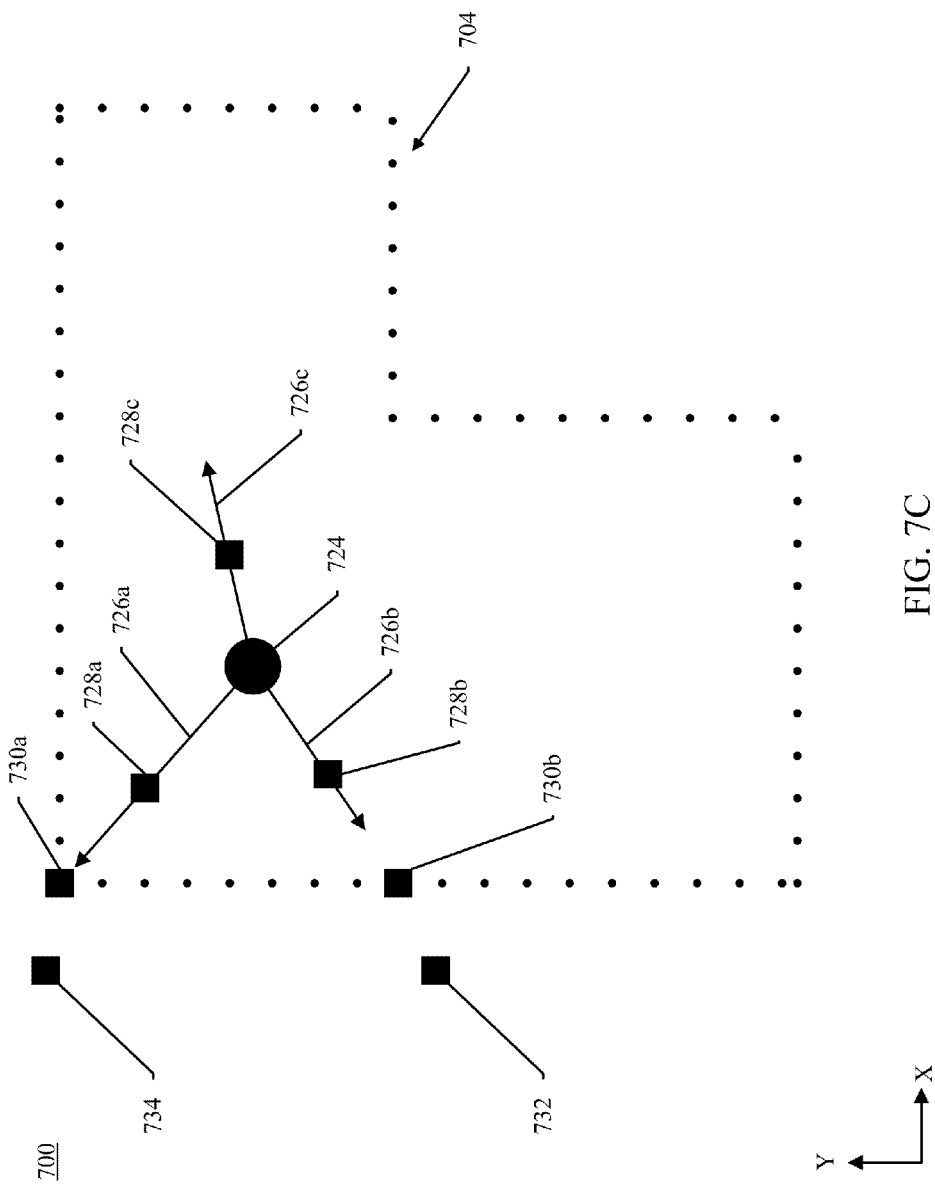

FIG. 7C illustrates an example of determining the matching score using s(t), in accordance with various aspects of the subject technology. As discussed above, trolley 724 may traverse the environment represented by the plurality of projected 3D points 704 in order to scan the environment with lasers and generate the plurality of 3D points of the environment. For example, trolley 724 may comprise one or more laser scanners that emit lasers 726a, 726b, and 726c towards the walls (or other suitable structures) of the environment, thereby generating the plurality of 3D points of the environment at the walls. The laser scans not only provide the plurality of 3D points of the environment, but also provide knowledge of whether or not a space between the trolley 724 and the walls of the environment is empty or not. This information about the empty space of the environment may be used to compute at least part of the matching score. In particular, s(t) may be based on the empty space of the environment.

According to certain aspects, layout 700 may be represented as a grid of pixels. However, since layout 700 is 2D instead of 3D, each pixel of layout 700 may also represent an aggregate of corresponding voxels of a layer of the environment associated with layout 700. In some aspects, s(t) may be given by $$s(t) = \frac{\sum_{i \in t} v_i}{\sum_{i | v_i > 0} v_i}, \qquad (2)$$

where v is an emptiness score associated with a pixel of layout 700, and i is an identifier of a corresponding pixel associated with v. The emptiness score may be indicative of a count of the number of times a laser associated with corresponding ones of the plurality of projected 3D points intersected with the corresponding pixel. For example, since laser 726a intersects with pixel 728a, the count of pixel 728a may be one. However, the count of pixel 728a may increase when other lasers intersect with pixel 728a while trolley 724 is in other positions. Thus, the higher the count of a particular pixel, the greater the likelihood that the particular pixel is empty space. Similarly, since laser 726b intersects with pixel 728b, the count of pixel 728b may be one, although other lasers may increase this count. Since laser 726c intersects with pixel 728c, the count of pixel 728c may also be one, although other lasers may increase this count. According to certain aspects, since layout 700 is 2D, each pixel may be an aggregate of one or more corresponding voxels of a layer of the environment associated with layout 700.

In some aspects, each pixel at which a 3D point is generated may be given a zero count. For example, the 3D point at pixel 730a, which corresponds to laser 726a, may be given a zero count. The 3D point at pixel 730b, which corresponds to laser 726b, may be given a zero count. Pixels that never intersect with a laser, such as pixels 732 and 734, may also be given a zero count. In order to clearly differentiate pixels that are considered to be empty space (based on the emptiness score) from pixels that are not considered to be empty space (based on the emptiness score), large negative values may be assigned to those pixels with zero count. However, it may be desirable to have smooth transitions from pixels with positive counts to pixels with the large negative values. In this regard, for each $v_i$ having a zero count, layout module 104 may determine, using a distance transform (e.g., a Felzenszwalb and/or Huttenlocher transform), a distance from a corresponding pixel to a closest pixel having a positive count, and may assign a negative value to the corresponding $v_i$. The assigned negative value may be proportional to the distance. In this way, a smooth transition from pixels with positive counts to pixels with large negative values may be achieved.

According to certain aspects, s(t) may be considered a ratio of the summation of the emptiness scores of pixels inside the 2D set t to the summation of the emptiness scores of pixels having positive counts. In this regard, s(t) may provide an indication of how similar a shape of the 2D set t is to the shape of the environment represented by the plurality of projected 3D points. The higher this ratio is, the higher the matching score may be.

According to various aspects of the subject technology, layout module 104 may select one or more 2D primitives that maximizes the matching score given by equation (1). In this regard, the 2D set of 2D primitives comprises the selected ones of the 2D primitives. FIGS. 8A, 8B, 8C, and 8D illustrate 2D models 412, 414, 416, and 418 comprising the one or more selected 2D primitives 420 that form the 2D set, in accordance with various aspects of the subject technology. As shown in these figures, the one or more selected 2D primitives 420 are combined with one another to generate the 2D models 412, 414, 416, and 418. These 2D models are aligned accurately with the plurality of projected 3D points.

According to step S206 in FIG. 2, construction module 106 may generate a 3D model of the environment based on the 2D model of each layout (e.g., 2D models 412, 414, 416, and 418). The 3D model of the environment may be generated in a similar manner as each of the 2D models. For example, construction module 106 may generate a 3D primitive for each 2D primitive of the 2D set based on the one or more layers (e.g., layers 302, 304, 306, and 308). Each 3D primitive may comprise at least one of a cuboid, a polyhedron, an ellipsoid, and other suitable shapes. Construction module 106 may select a certain set of 3D primitives from the generated 3D primitives that provides an accurate representation of the environment. This set may be referred to as a 3D set. Construction module 106 may then generate the 3D model of the environment based on the 3D set. The 3D model, for example, may comprise 3D primitives from the 3D set that are added to one another and/or subtracted from one another to form a representation of the environment. For example, the 3D model may comprise a constructive solid geometry (CSG) model (e.g., a Boolean combination of two or more 3D primitives). This CSG model may be expressed as a binary tree with each leaf of the tree representing a 3D primitive and each node of the tree representing an operation for the Boolean combination, such as an intersection of two 3D primitives, a union of two 3D primitives, and/or a difference between two 3D primitives.

Figure 9:
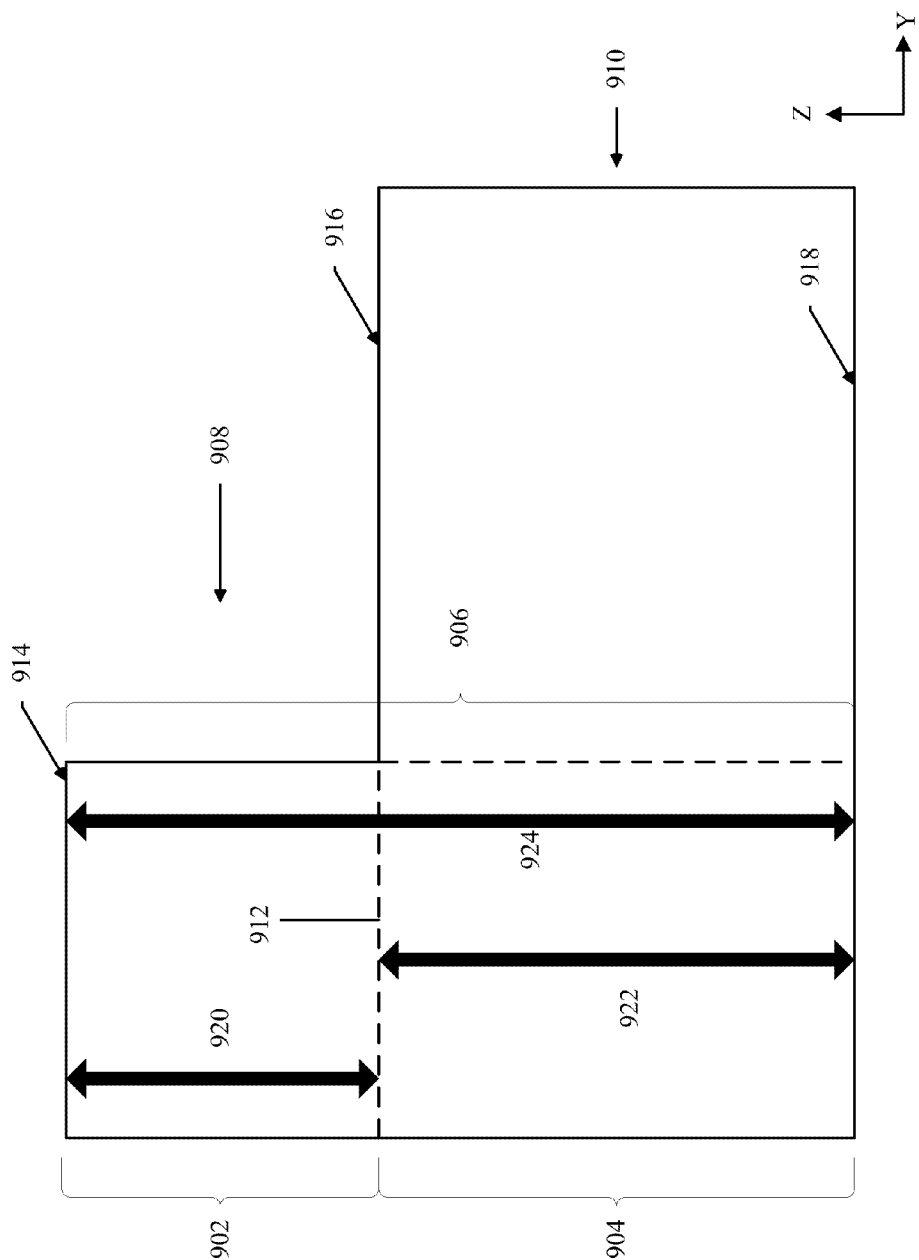
FIG. 9 illustrates an example of generating 3D primitives, in accordance with various aspects of the subject technology.

FIG. 9 illustrates, from a side view, an example of generating 3D primitives 902, 904, and 906, in accordance with various aspects of the subject technology. FIG. 9 also illustrates a side view of layers 908 and 910 of an environment. Boundary 914 forms an upper boundary of layer 908, while boundary 916 forms a lower boundary of layer 908. Boundary 916 also forms an upper boundary of layer 910, while boundary 918 forms a lower boundary of layer 910. A 2D primitive 912 of layer 908 may be used to generate 3D primitives 902, 904, and 906. For example, 2D primitive 912 may comprise a rectangle. 2D primitive 912 may be extended to boundaries 914 and/or 918 to generate 3D primitives 902, 904, and 906. Thus, 3D primitive 902 may be a cuboid extending between boundaries 914 and 916, and comprise height 920. 3D primitive 904 may be a cuboid extending between boundaries 916 and 918, and comprise height 922. Similarly, 3D primitive 906 may be a cuboid extending between boundaries 914 and 918, and comprise height 924. Similar to the generation of 2D primitives, it may be desirable to generate an exhaustive number of 3D primitives using different combinations of the boundaries of the one or more layers of the environment so that the 3D set may be selected to generate the 3D model.

After generating the exhaustive number of 3D primitives, the 3D set of 3D primitives that provides an accurate representation of the environment can be selected to generate the 3D model. According to certain aspects, construction module 106 may remove at least one 3D primitive having a dimension less than a predetermined threshold, thereby allowing very small and/or narrow 3D primitives that may not be useful for generating the 3D model to be removed. Construction module 106 may also remove at least one 3D primitive that is substantially the same as another of the one or more 3D primitives.

Similar to selecting the 2D primitives, a matching score may be used to select the 3D set of 3D primitives. The matching score may be indicative of a degree of accuracy of the 3D set with respect to representing the plurality of 3D points that maps the environment. For example, the higher the matching score, the more accurate the 3D set is with respect to representing the plurality of 3D points. Aspects of the subject technology provide a method to maximize the matching score to obtain the 3D set of 3D primitives.

In some aspects, the 3D set comprises an initial one of the 3D primitives. The initial one of the 3D primitives may be selected as one that initially maximizes a matching score for the 3D set. Construction module 106 may determine an addition change in the matching score if a next one of the 3D primitives is added to the 3D set. Construction module 106 may also determine a subtraction change in the matching score if the next one is subtracted from the 3D set. Construction module 106 may also update the 3D set by adding the next one to the 3D set or subtracting the next one from the 3D set based on the addition change and the subtraction change. For example, the next one of the 3D primitives may be added to the 3D set or may be subtracted from the 3D set based on whether the addition change or the subtraction change increases the matching score by more than a predetermined threshold. In some aspects, the next one may be added to the 3D set if the addition change increases the matching score by more than the predetermined threshold. In contrast, the next one may not be added to the 3D set if the addition change does not increase the matching score by more than the predetermined threshold. In some aspects, the next one may be subtracted from the 3D set if the subtraction change increases the matching score by more than the predetermined threshold. In contrast, the next one may not be subtracted from the 3D set if the subtraction change does not increase the matching score by more than the predetermined threshold. The 3D set may be updated accordingly depending on whether the next one of the 3D primitives is to be added to the 3D set or subtracted from the 3D set. Construction module 106 may iterate through the rest of the 3D primitives and repeat the foregoing steps (e.g., determining the addition change, determining the subtraction change, and updating the 3D set) with subsequent ones of the 3D primitives until the matching score is maximized.

Similar to the matching score for the 2D primitive selection, the matching score for the 3D primitive selection may be given by $$W_S S(T) + W_P P(T) + W_R R(T) \tag{3}$$

where T is the 3D set of the 3D primitives, $W_S$ provides at least a portion of the matching score, S(T) is a function of T and adjusts the at least a portion of the matching score provided by $W_S$ based on an empty space of the environment, $W_P$ provides at least a portion of the matching score, P(T) is a function of T and adjusts the at least a portion of the matching score provided by $W_P$ based on a total number of 3D points of the environment, $W_R$ provides at least a portion of the matching score, and R(T) is a function of T and adjusts the at least a portion of the matching score provided by $W_R$ based on a surface area boundary of T. $W_S$, $W_P$, and $W_R$ may be assigned any suitable value for generating the matching score.

According to certain aspects, P(T) may be a 3D analogy of p(t), R(T) may be a 3D analogy of r(t), and S(T) may be a 3D analogy of s(t). For example, P(T) may be computed as a number of the plurality of 3D points that are aligned with a surface area boundary of T divided by a total number of the plurality of 3D points. R(T) may be computed as at least a portion of the surface area boundary of T that is aligned with corresponding ones of the plurality of 3D points divided by the surface area boundary of T.

According to certain aspects, the environment may be represented as a grid of voxels. Similar to s(t), S(T) may be given by $$S(T) = \frac{\sum_{I \in T} V_I}{\sum_{I | V_I > 0} V_I} \quad (4)$$

where V is an emptiness score associated with a voxel of the environment, and I is an identifier of a corresponding voxel associated with V. This emptiness score may be indicative of a count of the number of times a laser associated with corresponding ones of the plurality of 3D points intersected with the corresponding voxel. Similar to computing s(t), construction module 106 may assign a negative value to each $V_I$ having a zero count. Furthermore, for each $V_I$ having a zero count, construction module 106 may determine, using a distance transform (e.g., a Felzenszwalb and/or Huttenlocher transform), a distance from a corresponding voxel to a closest voxel having a positive count, and may assign a negative value to the corresponding $V_I$. The assigned negative value may be proportional to the distance. In this way, a smooth transition from voxels with positive counts to voxels with large negative values may be achieved.

According to various aspects of the subject technology, construction module 106 may select one or more 3D primitives that maximizes the matching score given by equation (3). In this regard, the 3D set of 3D primitives comprises the selected ones of the 3D primitives.

According to certain aspects, construction module 106 may align faces of each of the 3D primitives with one another. For example, construction module 106 may snap a 3D primitive to align its boundaries with the boundaries of another 3D primitive. Construction module 106 may also remove a 3D primitive that has a dimension less than a predetermined threshold (e.g., the 3D primitive is small compared to other 3D primitives) and/or does not affect a space of the environment (e.g., the existence of the 3D primitive does not change any space of the environment).

Figure 10:
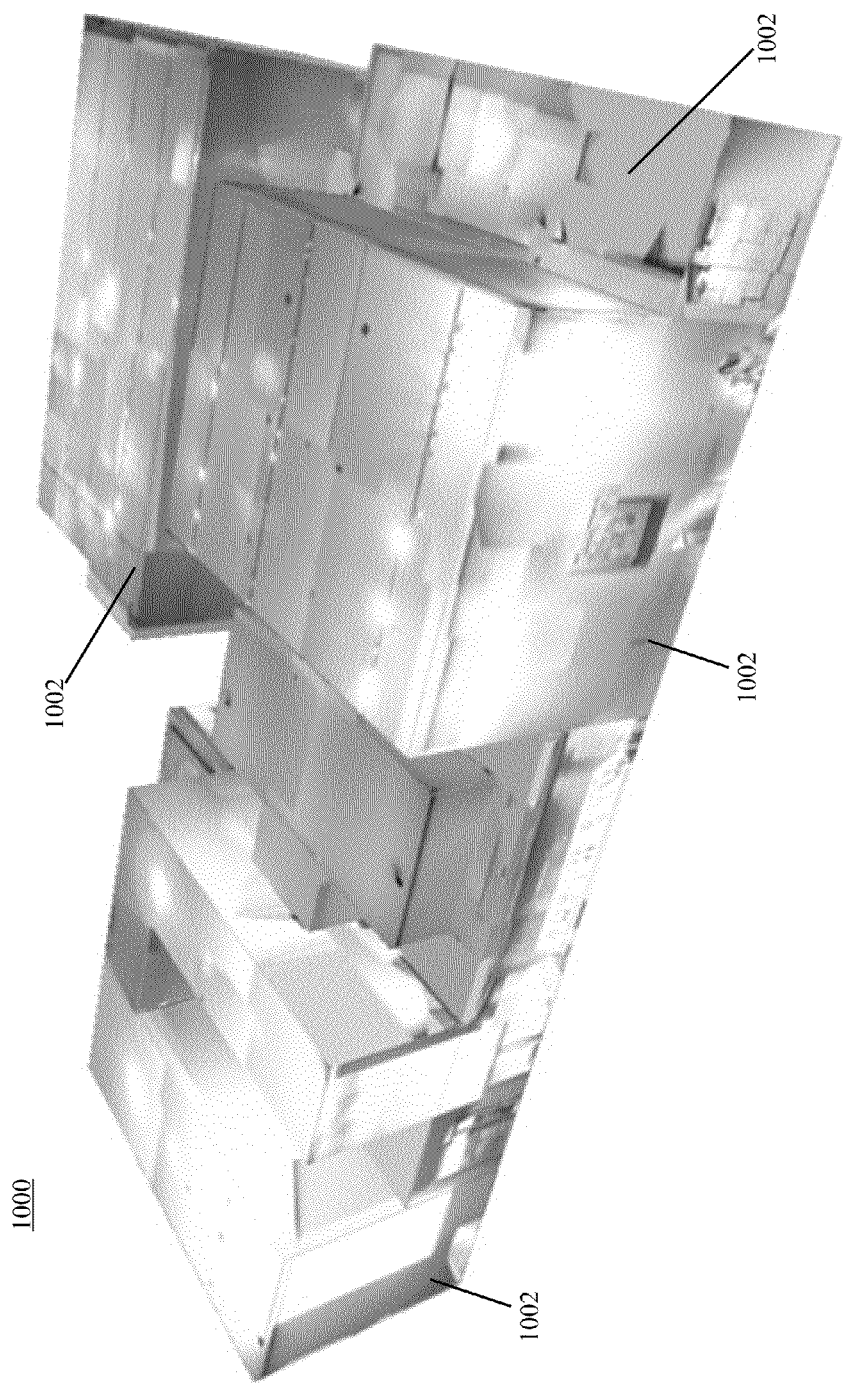
FIG. 10 illustrates an example of a 3D model, in accordance with various aspects of the subject technology.

Once the 3D set of 3D primitives has been selected, the 3D model of the model may be generated. As discussed above, the 3D model may comprise a CSG model. FIG. 10 illustrates an example of 3D model 1000, in accordance with various aspects of the subject technology. 3D model 1000, for example, may be a CSG model that comprises a Boolean combination of two or more 3D primitives 1002 from the 3D set. As shown in FIG. 10, 3D primitives 1002 comprise various sized cuboids. According to various aspects of the subject technology, it may be more convenient to render or manipulate a mesh model than a CSG model. In this regard, construction module 106 may convert 3D model 1000 (in the form of a CSG model) into a mesh model (e.g., a polygonal mesh model). Construction module 106 may convert the CSG model into the mesh model using a computational geometry algorithms library (CGAL) or other suitable techniques known to those of ordinary skill in the art.

Figure 11:
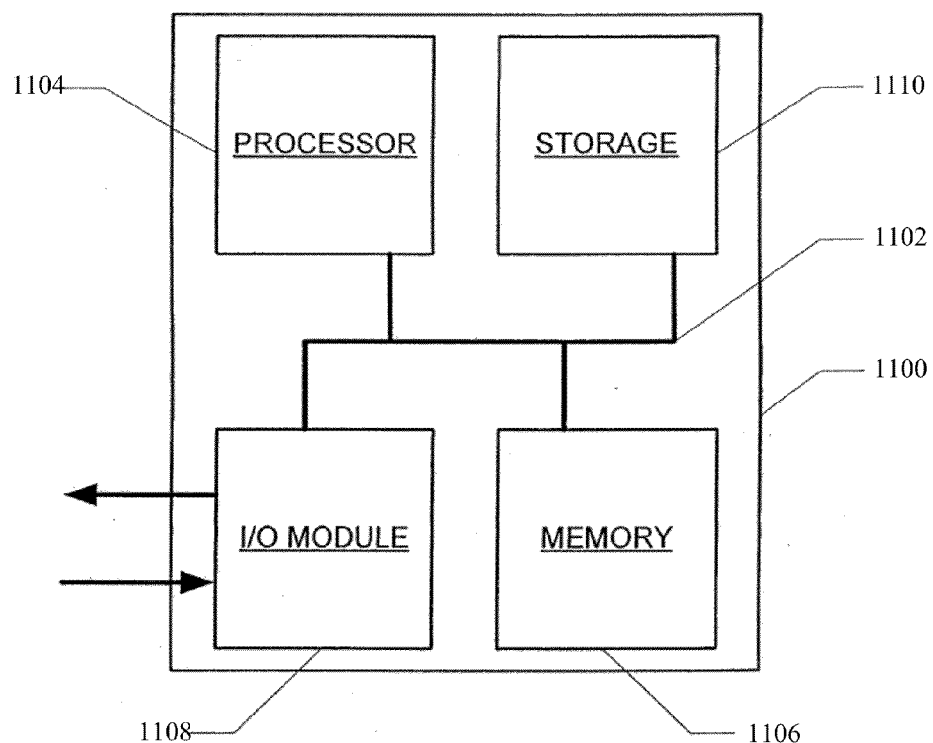
FIG. 11 is a block diagram illustrating components of a controller, in accordance with various aspects of the subject technology.

FIG. 11 is a block diagram illustrating components of controller 1100, in accordance with various aspects of the subject technology. Controller 1100 comprises processor module 1104, storage module 1110, input/output (I/O) module 1108, memory module 1106, and bus 1102. Bus 1102 may be any suitable communication mechanism for communicating information. Processor module 1104, storage module 1110, I/O module 1108, and memory module 1106 are coupled with bus 1102 for communicating information between any of the modules of controller 1100 and/or information between any module of controller 1100 and a device external to controller 1100. For example, information communicated between any of the modules of controller 1100 may include instructions and/or data. In some aspects, bus 1102 may be a universal serial bus. In some aspects, bus 1102 may provide Ethernet connectivity.

In some aspects, processor module 1104 may comprise one or more processors, where each processor may perform different functions or execute different instructions and/or processes. For example, one or more processors may execute instructions for operating system 100, one or more processors may execute instructions for generating a model of an environment, and one or more processors may execute instructions for input/output functions.

Memory module 1106 may be random access memory ("RAM") or other dynamic storage devices for storing information and instructions to be executed by processor module 1104. Memory module 1106 may also be used for storing temporary variables or other intermediate information during execution of instructions by processor 1104. In some aspects, memory module 1106 may comprise battery-powered static RAM, which stores information without requiring power to maintain the stored information. Storage module 1110 may be a magnetic disk or optical disk and may also store information and instructions. In some aspects, storage module 1110 may comprise hard disk storage or electronic memory storage (e.g., flash memory). In some aspects, memory module 1106 and storage module 1110 are both a machine-readable medium.

Controller 1100 is coupled via I/O module 1108 to a user interface for providing information to and receiving information from an operator of system 100. For example, the user interface may be a cathode ray tube ("CRT") or LCD monitor for displaying information to an operator. The user interface may also include, for example, a keyboard or a mouse coupled to controller 1100 via I/O module 1108 for communicating information and command selections to processor module 1104.

According to various aspects of the subject disclosure, methods described herein are executed by controller 1100. Specifically, processor module 1104 executes one or more sequences of instructions contained in memory module 1106 and/or storage module 1110. In one example, instructions may be read into memory module 1106 from another machine-readable medium, such as storage module 1110. In another example, instructions may be read directly into memory module 1106 from I/O module 1108, for example from an operator of system 100 via the user interface. Execution of the sequences of instructions contained in memory module 1106 and/or storage module 1110 causes processor module 1104 to perform methods to generate a model of an environment. For example, a computational algorithm for generating a model of an environment may be stored in memory module 1106 and/or storage module 1110 as one or more sequences of instructions. Information such as the one or more layers of the environment, the plurality of 3D points, the one or more layouts, the one or more line segments, the one or more 2D primitives, the one or more 3D primitives, the 2D model of the environment for each layout, the 3D model of the environment, the matching score for the 2D set, the matching score for the 3D set, and/or other suitable information may be communicated from processor module 1104 to memory module 1106 and/or storage module 1110 via bus 1102 for storage. In some aspects, the information may be communicated from processor module 1104, memory module 1106, and/or storage module 1110 to I/O module 1108 via bus 1102. The information may then be communicated from I/O module 1108 to an operator of system 100 via the user interface.

One or more processors in a multi-processing arrangement may also be employed to execute the sequences of instructions contained in memory module 1106 and/or storage module 1110. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 1104 for execution. Such a medium may take many forms, including, but not limited to, non-volatile media and volatile media. Non-volatile media include, for example, optical or magnetic disks, such as storage module 1110. Volatile media include dynamic memory, such as memory module 1106. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Methods, systems, and/or machine-readable media for generating a model of an environment are illustrated, for example, according to various aspects described below. These are provided as examples, and do not limit the subject technology.

According to various aspects of the subject technology, a system for generating a model of an environment is provided. The system comprises a layer module configured to identify one or more layers of the environment based on a plurality of three-dimensional (3D) points mapping the environment. The system also comprises a layout module configured to generate a layout for each layer. Each layout comprises a two-dimensional (2D) model of the environment. The system also comprises a construction module configured to generate a 3D model of the environment based on the 2D model of each layout.

In some aspects, each 3D point comprises a laser scanned 3D point. Each 3D point comprises at least one of an elevation coordinate with respect to the environment and a horizontal coordinate with respect to the environment. The layout module is configured to: identify one or more elevations of the environment at which the plurality of 3D points exceeds a predetermined layer threshold; and divide the environment at the identified one or more elevations. An upper boundary of each layer is formed at one of the identified one or more elevations, and a lower boundary of each layer is formed at one of the identified one or more elevations.

In some aspects, each layer comprises corresponding ones of the plurality of 3D points. Each layout comprises a floor plan of a corresponding layer. Each layout is parallel with a ground plane of the environment. In some aspects, the layout module is configured to: project the plurality of 3D points onto corresponding ones of the one or more layouts; generate one or more line segments for each layout based on corresponding ones of the plurality of projected 3D points; generate one or more 2D primitives for each layout based on corresponding ones of the one or more line segments; select a 2D set of the one or more 2D primitives based on corresponding ones of the plurality of 3D points; and generate the 2D model of the environment for each layout based on a corresponding 2D set of the one or more 2D primitives. The plurality of 3D points are projected perpendicularly onto corresponding ones of the one or more layouts. The one or more line segments are generated using a Hough transform.

In some aspects, the layout module is configured to assign the plurality of projected 3D points to a nearest one of the one or more line segments, and to remove at least one of the one or more line segments having less than a predetermined threshold number of projected 3D points assigned to it. The layout module is configured to estimate at least one horizontal axis of each layout, and to align at least one of the one or more line segments with the at least one horizontal axis. At least one 2D primitive is generated based on two corresponding line segments perpendicular to one another and intersecting with one another. At least one 2D primitive is generated based on two corresponding line segments parallel to one another and within a predetermined distance of one another. At least one of the one or more line segments forms at least a partial side of a corresponding 2D primitive. Each 2D primitive comprises at least one of a rectangle, a triangle, and an ellipse.

In some aspects, the layout module is configured to remove at least one 2D primitive having a dimension less than a predetermined threshold. The layout module is configured to remove at least one 2D primitive that is substantially the same as another of the one or more 2D primitives. The layout module is configured to remove at least one 2D primitive having less than a predetermined number of projected 3D points adjacent to its edge within a predetermined distance. Each 2D model comprises a corresponding 2D set of the one or more 2D primitives. Each 2D model comprises a constructive solid geometry (CSG) model. Each 2D model comprises a Boolean combination of two or more 2D primitives of a corresponding 2D set. The 2D set comprises an initial one of the one or more 2D primitives that corresponds to a matching score for the 2D set. The matching score is indicative of a degree of accuracy of the 2D set with respect to representing corresponding ones of the plurality of projected 3D points. The layout module is configured to: determine an addition change in the matching score if a next one of the one or more 2D primitives is added to the 2D set; determine a subtraction change in the matching score if the next one is subtracted from the 2D set; and update the 2D set by adding the next one to the 2D set or subtracting the next one from the 2D set based on the addition change and the subtraction change.

In some aspects, the next one is added to the 2D set or is subtracted from the 2D set based on whether the addition change or the subtraction change increases the matching score by more than a predetermined threshold. The next one is added to the 2D set if the addition change increases the matching score by more than the predetermined threshold. The next one is subtracted from the 2D set if the subtraction change increases the matching score by more than the predetermined threshold. The next one is not added to the 2D set if the addition change does not increase the matching score by more than the predetermined threshold, and the next one is not subtracted from the 2D set if the subtraction change does not increase the matching score by more than the predetermined threshold. The layout module is configured to repeat the determining the addition change, the determining the subtraction change, and the updating the 2D set with subsequent ones of the one or more 2D primitives until the matching score is maximized.

In some aspects, the layout module is configured to determine the matching score for the 2D set. The matching score is given by $w_s s(t)+w_p p(t)+w_r r(t)$, where t is the 2D set of the one or more 2D primitives, $w_s$ provides at least a portion of the matching score, $$s(t) = \frac{\sum_{i \in t} v_i}{\sum_{i | v_i > 0} v_i},$$

v is an emptiness score associated with a pixel of a corresponding layout, the emptiness score being indicative of a count of the number of times a laser associated with corresponding ones of the plurality of projected 3D points intersected with the corresponding pixel, i is an identifier of a corresponding pixel associated with v, $w_p$ provides at least a portion of the matching score, p(t) is a number of the plurality of projected 3D points that are aligned with a perimeter of t divided by a total number of the plurality of projected 3D points of a corresponding layout, $w_r$ provides at least a portion of the matching score, and r(t) is at least a portion of the perimeter of t that is aligned with corresponding ones of the plurality of projected 3D points divided by the perimeter of t.

In some aspects, each pixel is an aggregate of one or more corresponding voxels of a corresponding layer. The layout module is configured to assign a negative value to each $v_i$ having a zero count. For each $v_i$ having a zero count, the layout module is configured to: determine, using a distance transform, a distance from a corresponding pixel to a closest pixel having a positive count; and assign a negative value to the corresponding $v_i$. The assigned negative value is proportional to the distance.

In some aspects, the construction module is configured to: generate a 3D primitive for each 2D primitive of the 2D set of the one or more 2D primitives based on the one or more layers; select a 3D set of the one or more 3D primitives based on the plurality of 3D points; and generate the 3D model of the environment based on the 3D set of the one or more 3D primitives. At least one 3D primitive is generated by extending a corresponding 2D primitive to at least two boundaries of the one or more layers. The construction module is configured to extend each 2D primitive of the 2D set to a boundary of at least one of the one or more layers to generate a corresponding 3D primitive.

In some aspects, the construction module is configured to extend each 2D primitive of the 2D set to a boundary of each of the one or more layers to generate corresponding 3D primitives. Each 3D primitive comprises at least one of a cuboid, a polyhedron, and an ellipsoid. The construction module is configured to remove at least one 3D primitive having a dimension less than a predetermined threshold. The construction module is configured to remove at least one 3D primitive that is substantially the same as another of the one or more 3D primitives. The 3D model comprises the 3D set of the one or more 3D primitives.

In some aspects, the 3D model comprises a constructive solid geometry (CSG) model. The 3D model comprises a Boolean combination of two or more 3D primitives of the 3D set. The 3D set comprises an initial one of the one or more 3D primitives that corresponds to a matching score for the 3D set. The matching score is indicative of a degree of accuracy of the 3D set with respect to representing the plurality of 3D points. The construction module is configured to: determine an addition change in the matching score if a next one of the one or more 3D primitives is added to the 3D set; determine a subtraction change in the matching score if the next one is subtracted from the 3D set; and update the 3D set by adding the next one to the 3D set or subtracting the next one from the 3D set based on the addition change and the subtraction change.

In some aspects, the next one is added to the 3D set or is subtracted from the 3D set based on whether the addition change or the subtraction change increases the matching score by more than a predetermined threshold. The next one is added to the 3D set if the addition change increases the matching score by more than the predetermined threshold, and the next one is subtracted from the 3D set if the subtraction change increases the matching score by more than the predetermined threshold. The next one is not added to the 3D set if the addition change does not increase the matching score by more than the predetermined threshold, and the next one is not subtracted from the 3D set if the subtraction change does not increase the matching score by more than the predetermined threshold. The construction module is configured to repeat the determining the addition change, the determining the subtraction change, and the updating the 3D set with subsequent ones of the one or more 3D primitives until the matching score is maximized.

In some aspects, the construction module is configured to determine the matching score for the 3D set. The matching score is given by $W_S S(T)+W_P P(T)+W_R R(T)$, where T is the 3D set of the one or more 3D primitives, $W_S$ provides at least a portion of the matching score, $$S(T) = \frac{\sum_{I \in T} V_I}{\sum_{I | V_I > 0} V_I},$$

and V is an emptiness score associated with a voxel of the environment. The emptiness score is indicative of a count of the number of times a laser associated with corresponding ones of the plurality of 3D points intersected with the corresponding voxel. I is an identifier of a corresponding voxel associated with V, $W_P$ provides at least a portion of the matching score, P(T) is a number of the plurality of 3D points that are aligned with a surface area boundary of T divided by a total number of the plurality of 3D points, $W_R$ provides at least a portion of the matching score, and R(T) is at least a portion of the surface area boundary of T that is aligned with corresponding ones of the plurality of 3D points divided by the surface area boundary of T.

In some aspects, the construction module is configured to assign a negative value to each $V_I$ having a zero count. For each $V_I$ having a zero count, the construction module is configured to: determine, using a distance transform, a distance from a corresponding voxel to a closest voxel having a positive count; and assign a negative value to the corresponding $V_r$. The assigned negative value is proportional to the distance.

In some aspects, the construction module is configured to align faces of each of the one or more 3D primitives with one another. The construction module is configured to remove at least one of the one or more 3D primitives that has a dimension less than a predetermined threshold and/or does not affect a space of the environment. The 3D model comprises a constructive solid geometry (CSG) model, and the construction module is configured to convert the CSG model into a mesh model. The construction module is configured to convert the CSG model into the mesh model using a computational geometry algorithms library (CGAL).

According to various aspects of the subject technology, a computer-implemented method for generating a model of an environment is provided. The method comprises identifying one or more layers of the environment based on a plurality of three-dimensional (3D) points mapping the environment and generating a layout for each layer. Each layout comprises a two-dimensional (2D) model of the environment. The method also comprises generating a 3D model of the environment based on the 2D model of each layout.

In some aspects, identifying the one or more layers comprises: identifying one or more elevations of the environment at which the plurality of 3D points exceeds a predetermined layer threshold; and dividing the environment at the identified one or more elevations. An upper boundary of each layer is formed at one of the identified one or more elevations. A lower boundary of each layer is formed at one of the identified one or more elevations.

In some aspects, the method further comprises: projecting the plurality of 3D points onto corresponding ones of the one or more layouts; generating one or more line segments for each layout based on corresponding ones of the plurality of projected 3D points; generating one or more 2D primitives for each layout based on corresponding ones of the one or more line segments; selecting a 2D set of the one or more 2D primitives based on corresponding ones of the plurality of 3D points; and generating the 2D model of the environment for each layout based on a corresponding 2D set of the one or more 2D primitives.

In some aspects, the 2D set comprises an initial one of the one or more 2D primitives that corresponds to a matching score for the 2D set. The matching score is indicative of a degree of accuracy of the 2D set with respect to representing corresponding ones of the plurality of projected 3D points. Selecting the 2D set comprises: determining an addition change in the matching score if a next one of the one or more 2D primitives is added to the 2D set; determining a subtraction change in the matching score if the next one is subtracted from the 2D set; and updating the 2D set by adding the next one to the 2D set or subtracting the next one from the 2D set based on the addition change and the subtraction change.

In some aspects, generating the 3D model comprises: generating a 3D primitive for each 2D primitive of the 2D set of the one or more 2D primitives based on the one or more layers; selecting a 3D set of the one or more 3D primitives based on the plurality of 3D points; and generating the 3D model of the environment based on the 3D set of the one or more 3D primitives.

In some aspects, the 3D set comprises an initial one of the one or more 3D primitives that corresponds to a matching score for the 3D set. The matching score is indicative of a degree of accuracy of the 3D set with respect to representing the plurality of 3D points. Selecting the 3D set comprises: determining an addition change in the matching score if a next one of the one or more 3D primitives is added to the 3D set; determining a subtraction change in the matching score if the next one is subtracted from the 3D set; and updating the 3D set by adding the next one to the 3D set or subtracting the next one from the 3D set based on the addition change and the subtraction change.

According to various aspects of the subject technology, a machine-readable medium encoded with executable instructions for generating a model of an environment is provided. The instructions comprise code for: identifying one or more layers of the environment based on a plurality of three-dimensional (3D) points mapping the environment; generating a layout for each layer; projecting the plurality of 3D points onto corresponding ones of the one or more layouts; generating one or more line segments for each layout based on corresponding ones of the plurality of projected 3D points; generating one or more 2D primitives for each layout based on corresponding ones of the one or more line segments; selecting a 2D set of the one or more 2D primitives based on corresponding ones of the plurality of 3D points; generating a two-dimensional (2D) model of the environment for each layout based on a corresponding 2D set of the one or more 2D primitives; and generating a 3D model of the environment based on the 2D model of each layout.

In some aspects, generating the 3D model comprises: generating a 3D primitive for each 2D primitive of the 2D set of the one or more 2D primitives based on the one or more layers; selecting a 3D set of the one or more 3D primitives based on the plurality of 3D points; and generating the 3D model of the environment based on the 3D set of the one or more 3D primitives.

In some aspects, the 2D set comprises an initial one of the one or more 2D primitives that corresponds to a matching score for the 2D set. The matching score is indicative of a degree of accuracy of the 2D set with respect to representing corresponding ones of the plurality of projected 3D points. Selecting the 2D set comprises: determining an addition change in the matching score if a next one of the one or more 2D primitives is added to the 2D set; determining a subtraction change in the matching score if the next one is subtracted from the 2D set; and updating the 2D set by adding the next one to the 2D set or subtracting the next one from the 2D set based on the addition change and the subtraction change.

In some aspects, the instructions further comprise code for determining the matching score for the first set. The matching score is given by $w_s s(t)+w_p p(t)+w_r r(t)$, where t is the 2D set of the one or more 2D primitives, $w_s$ provides at least a portion of the matching score, $$s(t) = \frac{\sum_{i \in t} v_i}{\sum_{i | v_i > 0} v_i},$$

and v is an emptiness score associated with a pixel of a corresponding layout. The emptiness score is indicative of a count of the number of times a laser associated with corresponding ones of the plurality of projected 3D points intersected with the corresponding pixel. i is an identifier of a corresponding pixel associated with v, $w_p$ provides at least a portion of the matching score, p(t) is a number of the plurality of projected 3D points that are aligned with a perimeter of t divided by a total number of the plurality of projected 3D points of a corresponding layout, $w_r$ provides at least a portion of the matching score, and r(t) is at least a portion of the perimeter of t that is aligned with corresponding ones of the plurality of projected 3D points divided by the perimeter of t.

According to various aspects of the subject technology, a processor comprising one or more modules configured to perform the method or function described in any of the foregoing examples is provided. In some aspects, a machine-readable medium encoded with executable instructions for performing the method or function described in any one of the foregoing examples is provided. In some aspects, an apparatus comprising components operable to perform the method or function described in any one of the foregoing examples is provided.

In some aspects, any of the foregoing examples may depend from any one of the other examples. In some aspects, any of the examples may be combined with any other examples. In some aspects, the methods and/or modules described above can be represented in drawings.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology.

What is claimed is:

1. A system for generating a three-dimensional (3D) model of an environment, the system comprising one or more processors configured to:
   identify one or more layers of the environment based on a plurality of 3D points mapping the environment;
   generate a layout for each of the one or more layers, wherein each layout comprises a two-dimensional (2D) model of the environment, and wherein generating a given layout for one of the one or more layers includes:
      projecting the plurality of 3D points onto the given layout,
      generating one or more 2D primitives for the given layout based on corresponding ones of the plurality of projected 3D points,
      selecting a 2D set of the one or more 2D primitives for the given layout based on a matching score for the 2D set, wherein the matching score is indicative of a degree of accuracy of the 2D set for the given layout with respect to representing corresponding ones of the plurality of projected 3D points, wherein the selecting includes determining an addition change in the matching score if a next one of the one or more 2D primitives is added to the 2D set for the given layout, determining a subtraction change in the matching score if the next one is subtracted from the 2D set for the given layout, updating the 2D set for the given layout by adding the next one to the 2D set for the given layout or subtracting the next one from the 2D set for the given layout based on the addition change and the subtraction change, and
      generating the 2D model of the environment for the given layout based on the 2D set for the given layout; and
   generate the 3D model of the environment based on the 2D models for each layout.

2. The system of claim 1, wherein the one or more processors are further configured to:
   identify one or more elevations of the environment at which the plurality of 3D points exceeds a predetermined layer threshold; and
   divide the environment at the identified one or more elevations, wherein an upper boundary of each layer is formed at one of the identified one or more elevations, and wherein a lower boundary of each layer is formed at one of the identified one or more elevations.

3. The system of claim 1, wherein the one or more processors are further configured to further generate the given layout by:
generating one or more line segments for the given layout based on corresponding ones of the plurality of projected 3D points; and
generating the one or more 2D primitives for the given layout based on corresponding ones of the one or more line segments.

4. The system of claim 3, wherein for the given layout, at least one of the one or more line segments forms at least a partial side of a corresponding 2D primitive for the given layout.

5. The system of claim 3, wherein the one or more processors are further configured to:
generate a corresponding 3D primitive for each 2D primitive of the one or more layers;
select a 3D set of the 3D primitives based on the plurality of 3D points; and
generate the 3D model of the environment based on the 3D set.

6. The system of claim 5, wherein the one or more processors are further configured to extend a given 2D primitive of the one or more layers to a boundary of at least one of the one or more layers to generate a corresponding 3D primitive for the given 2D primitive.

7. The system of claim 5, wherein the 3D model comprises a Boolean combination of two or more 3D primitives of the 3D set.

8. The system of claim 5, wherein the 3D set comprises an initial one of the one or more 3D primitives that corresponds to a matching score for the 3D set, wherein the matching score for the 3D set is indicative of a degree of accuracy of the 3D set with respect to representing the plurality of 3D points, and wherein the one or more processors are further configured to:
determine an addition change in the matching score if a next one of the one or more 3D primitives is added to the 3D set;
determine a subtraction change in the matching score for the 3D set if the next one is subtracted from the 3D set; and
update the 3D set by adding the next one to the 3D set or subtracting the next one from the 3D set based on the addition change and the subtraction change.

9. The system of claim 8, wherein one or more processors are further configured to add the next one to or subtract the next one from the 3D set based on whether the addition change or the subtraction change increases the matching score for the 3D set by more than a predetermined threshold.

10. The system of claim 8, wherein the next one repeat the determining the addition change, the determining the subtraction change, and the updating the 3D set with subsequent ones of the one or more 3D primitives until the matching score for the 3D set is maximized.

11. The system of claim 8, wherein the matching score for the 3D set is given by $$W_S S(T) + W_P P(T) + W_R R(T),$$

where
T is the 3D set of the one or more 3D primitives,
$W_S$ provides at least a portion of the matching score for the 3D set, $$S(T) = \frac{\sum_{I \in T} V_I}{\sum_{I||V_I|>0} V_I},$$

V is an emptiness score associated with a voxel of the environment, the emptiness score being indicative of a count of the number of times a laser associated with corresponding ones of the plurality of 3D points intersected with the corresponding voxel,
I is an identifier of a corresponding voxel associated with V,
$W_P$ provides at least a portion of the matching score for the 3D set,
P(T) is a number of the plurality of 3D points that are aligned with a surface area boundary of T divided by a total number of the plurality of 3D points,
$W_R$ provides at least a portion of the matching score for the 3D set, and
R(T) is at least a portion of the surface area boundary of T that is aligned with corresponding ones of the plurality of 3D points divided by the surface area boundary of T.

12. The system of claim 11, wherein the one or more processors are further configured to assign a negative value to each $V_I$ having a zero count.

13. The system of claim 11, wherein, for each $V_I$ having a zero count, the one or more processors are further configured to:
determine, using a distance transform, a distance from a corresponding voxel to a closest voxel having a positive count; and
assign a negative value to the corresponding $V_I$.

14. The system of claim 1, wherein one or more processors are further configured to generate the given layout by adding the next one to the 2D set for the given layout or subtracted the next one from the 2D set for the given layout based on whether the addition change or the subtraction change increases the matching score by more than a predetermined threshold.

15. The system of claim 1, wherein one or more processors are further configured to generate the given layout by repeating the determining the addition change, the determining the subtraction change, and the updating the 2D set for the given layout with subsequent ones of the one or more 2D primitives for the given layout until the matching score is maximized.

16. The system of claim 1, wherein the one or more processors are further configured to, for the given layout, generate the matching score according to:

$$w_s s(t) + w_p p(t) + w_r r(t),$$

where
t is the 2D set for the given layout,
$w_s$ provides at least a portion of the matching score, $$s(t) = \frac{\sum_{i \in t} v_i}{\sum_{i|v_i>0} v_i},$$

v is an emptiness score associated with a pixel of the given layout, the emptiness score being indicative of a count of the number of times a laser associated with corresponding ones of the plurality of projected 3D points intersected with the corresponding pixel,
i is an identifier of a corresponding pixel associated with v,
$w_p$ provides at least a portion of the matching score, p(t) is a number of the plurality of projected 3D points that are aligned with a perimeter of t divided by a total number of the plurality of projected 3D points of the given layout, $w_r$ provides at least a portion of the matching score, and r(t) is at least a portion of the perimeter of t that is aligned with corresponding ones of the plurality of projected 3D points divided by the perimeter of t.

17. The system of claim 16, wherein the one or more computing devices are further configured to, for the given layout, assign a negative value to each having a zero count.

18. The system of claim 16, wherein, for each $v_i$ having a zero count, the one or more processors are further configured to, for the given layout:

determine, using a distance transform, a distance from a corresponding pixel to a closest pixel having a positive count; and assign a negative value to the corresponding $v_i$.

19. The system of claim 1, wherein the 3D model comprises a constructive solid geometry (CSG) model, and wherein the to the one or more processors are further configured to convert the CSG model into a mesh model.

20. A computer-implemented method for generating a three-dimensional (3D) model of an environment, the method comprising:

identifying, by one or more processors, one or more layers of the environment based on a plurality of 3D points mapping the environment;

generating, by the one or more processors, a layout for each of the one or more layers, wherein each layout comprises a two-dimensional (2D) model of the environment; and generating, by the one or more processors, the 3D model of the environment based on the 2D model of each layout by:

generating a corresponding 3D primitive for each of a plurality of 2D primitives of the one or more layers, selecting a 3D set of the 3D primitives based on the plurality of 3D points a matching score for the 3D set, wherein the matching score is indicative of a degree of accuracy of the 3D set with respect to representing the plurality of 3D points, and wherein selecting the 3D set comprises:

determining an addition change in the matching score if a next one of the one or more 3D primitives is added to the 3D set, determining a subtraction change in the matching score if the next one is subtracted from the 3D set, and updating the 3D set by adding the next one to the 3D set or subtracting the next one from the 3D set based on the addition change and the subtraction change, and wherein generating the 3D model of the environment is further based on the 3D set.

21. The method of claim 20, further comprising:

projecting the plurality of 3D points onto corresponding ones of the one or more layouts;

generating one or more line segments for each layout based on corresponding ones of the plurality of projected 3D points;

generating one or more 2D primitives for each layout based on corresponding ones of the one or more line segments;

selecting a 2D set of the one or more 2D primitives for each layout based on corresponding ones of the plurality of 3D points; and generating the 2D model of the environment for each layout based on a corresponding 2D set of the one or more 2D primitives.

22. The method of claim 21, wherein the 2D set of the one or more 2D primitives for a given layout comprises an initial one of the one or more 2D primitives for the given layout that corresponds to a matching score for the given layout for the 2D set of the one or more 2D primitives for the given layout, wherein the matching score for the given layout is indicative of a degree of accuracy of the 2D set of the one or more 2D primitives for that given layout with respect to representing corresponding ones of the plurality of projected 3D points, and wherein selecting the 2D set of the one or more 2D primitives for the given layout comprises:

determining an addition change in the matching score for the given layout if a next one of the one or more 2D primitives for the given layout is added to the 2D set for the given layout;

determining a subtraction change in the matching score for the given layout if the next one is subtracted from the 2D set for the given layout; and updating the 2D set for the given layout by adding the next one to the 2D set for the given layout or subtracting the next one from the 2D set for the given layout based on the addition change and the subtraction change.

23. A non-transitory machine-readable medium encoded with executable instructions, the instructions when executed by one or more processors, cause the one or more processors to perform a method for generating a model of a three-dimensional (3D) environment, the method comprising:

identifying one or more layers of the environment based on a plurality of 3D points mapping the environment;

generating a layout for each of the one or more layers;

projecting the plurality of 3D points onto corresponding ones of the one or more layouts;

generating one or more line segments for each layout based on corresponding ones of the plurality of projected 3D points;

generating one or more 2D primitives for each layout based on corresponding ones of the one or more line segments;

selecting a 2D set of the one or more 2D primitives for a given layout of the one or more layers based on corresponding ones of the plurality of 3D points and a matching score for the 2D set for the given layout, wherein the matching score is indicative of a degree of accuracy of the 2D set for the given layout with respect to representing corresponding ones of the plurality of projected 3D points, and wherein selecting the 2D set for the given layout comprises:

determining an addition change in the matching score if a next one of the one or more 2D primitives is added to the 2D set for the given layout;

determining a subtraction change in the matching score if the next one is subtracted from the 2D set for the given layout; and updating the 2D set for the given layout by adding the next one to the 2D set for the given layout or subtracting the next one from the 2D set for the given layout based on the addition change and the subtraction change;

generating a two-dimensional (2D) model of the environment for each layout of the one or more layers based on a corresponding 2D set of the one or more 2D primitives; and generating the 3D model of the environment based on the 2D model of each layout.

24. The machine-readable medium of claim 23, wherein generating the 3D model comprises:

generating a corresponding 3D primitive for each 2D primitive of the one or more layers;

selecting a 3D set of the primitives based on the plurality of 3D points; and generating the 3D model of the environment based on the 3D set.

25. The machine-readable medium of claim 23, wherein the method further comprise determining the matching score for the 2D set for the given layout.

26. The machine-readable medium of claim 25, wherein, for the given layout, the matching score is determined according to $$w_s s(t) + w_p p(t) + w_r r(t),$$

where t is the 2D set for the given layout, $w_s$ provides at least a portion of the matching score, $$s(t) = \frac{\sum_{i \in t} v_i}{\sum_{i | v_i > 0} v_i},$$

v is an emptiness score associated with a pixel of the given layout, the emptiness score being indicative of a count of the number of times a laser associated with corresponding ones of the plurality of projected 3D points intersected with the corresponding pixel, i is an identifier of a corresponding pixel associated with v, $w_P$ provides at least a portion of the matching score, p(t) is a number of the plurality of projected 3D points that are aligned with a perimeter of t divided by a total number of the plurality of projected 3D points of the given layout, $w_r$ provides at least a portion of the matching score, and r(t) is at least a portion of the perimeter of t that is aligned with corresponding ones of the plurality of projected 3D points divided by the perimeter of t.

* * * * *